(12) United States Patent
Nishizono

(10) Patent No.: US 6,476,954 B1
(45) Date of Patent: Nov. 5, 2002

(54) OPTICAL COMMUNICATION DEVICE AND RECEIVING CIRCUIT THEREOF

(75) Inventor: Kazunori Nishizono, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/272,298

(22) Filed: Mar. 19, 1999

(30) Foreign Application Priority Data

Sep. 16, 1998 (JP) .......................................... 10-261420
Sep. 21, 1998 (JP) .......................................... 10-266487

(51) Int. Cl.$^7$ ............................................. H04B 10/06
(52) U.S. Cl. ...................... 359/189; 359/189; 375/317; 375/318; 327/514; 327/515
(58) Field of Search ........................................ 359/189

(56) References Cited

FOREIGN PATENT DOCUMENTS

| JP | 5-268141 | 10/1993 |
|---|---|---|
| JP | 6-311082 | 11/1994 |
| JP | 9-139711 | 5/1997 |

*Primary Examiner*—Jason Chan
*Assistant Examiner*—Dzung Tran
(74) *Attorney, Agent, or Firm*—Arent Fox Kintner Plotkin & Kahn

(57) ABSTRACT

An optical communication device includes a receiving circuit that generates an accurate voltage signal from received light. The voltage signal is then used to quickly and accurately determine emission information which is used to adjust the emission level of an associated light emitting diode, by varying the drive current supplied to the light emitting diode. The receiving circuit has a light receiving element that generates a current from received light. The current is converted into first and second current signals using a fixed distribution ratio. First and second amplifiers convert the first and second current signals to first and second voltages. A current control circuit is connected to the light receiving element and the second amplifier and controls the amount of the first current signal using the second voltage.

8 Claims, 19 Drawing Sheets

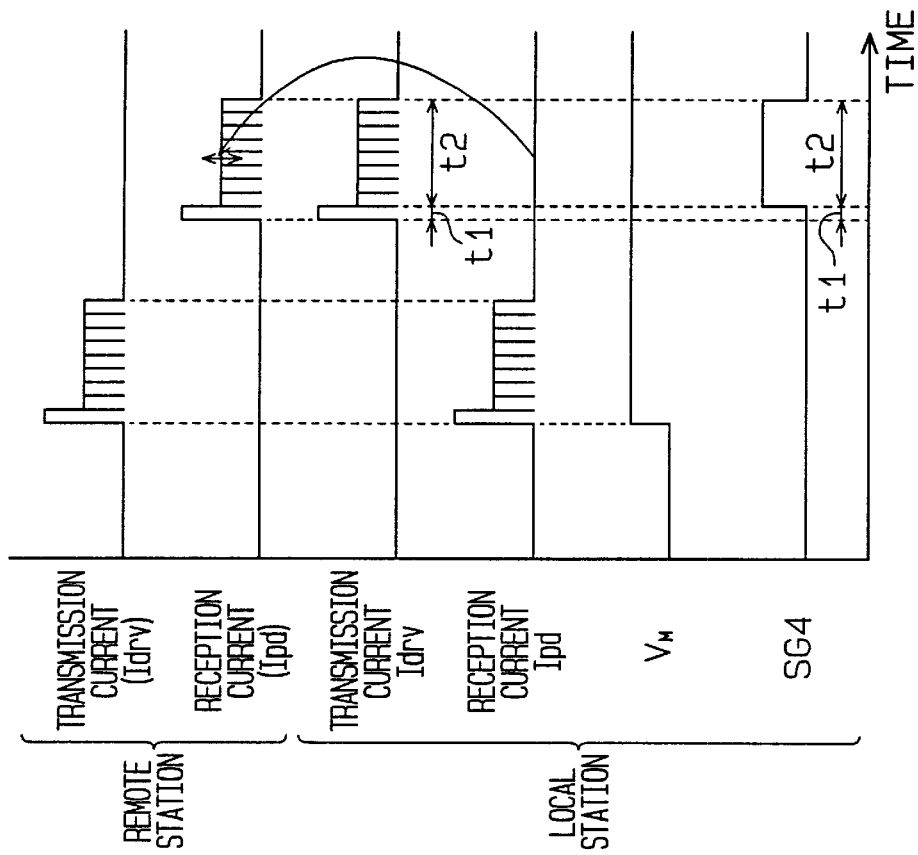
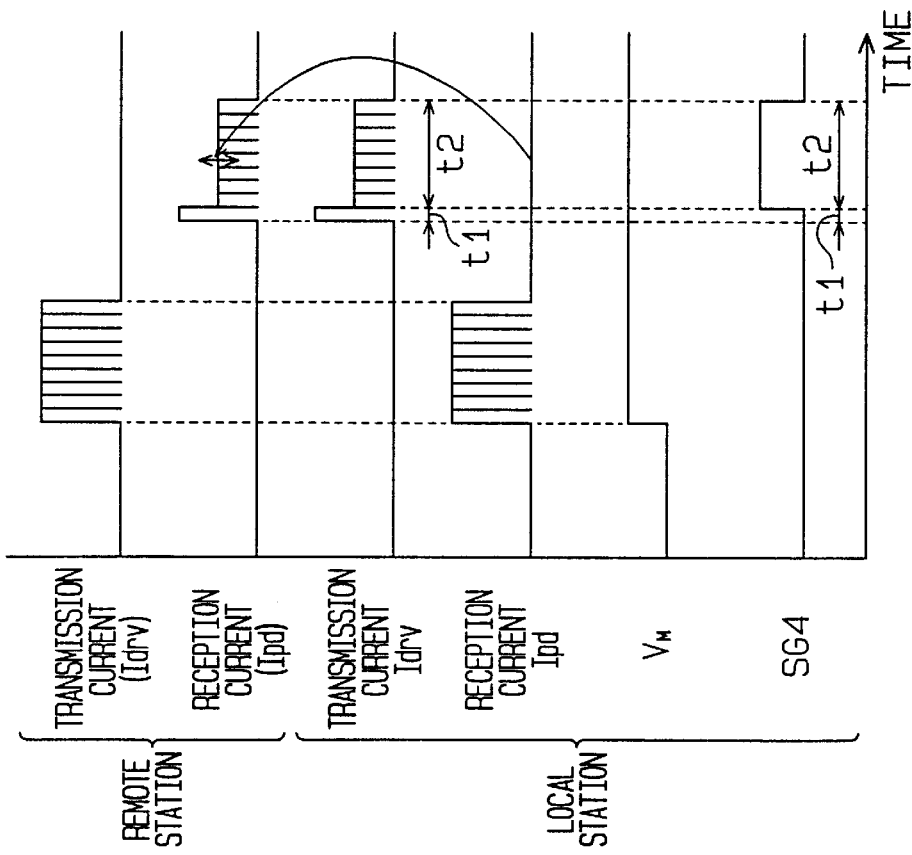

US 6,476,954 B1

OPTICAL COMMUNICATION DEVICE AND RECEIVING CIRCUIT THEREOF

BACKGROUND OF THE INVENTION

The present invention generally relates to an optical communication device, and, more particularly, to a power saving optical communication device and an amplifier of a receiving circuit which converts a current signal according to received light to a voltage signal.

An optical communication device for performing data communication is put to practical use, for example, using infrared rays. The optical communication device includes a receiving circuit for converting received light to a current signal. The receiving circuit includes an amplifier for converting the current signal to a voltage signal and a comparator for converting the voltage signal to a digital signal. In order to improve the receiving accuracy, the receiving circuit sets the current-to-voltage conversion rate in the amplifier and sets the clamping operation point of the current signal.

FIG. 1 is a schematic circuit diagram of a conventional receiving circuit 50. The anode of a photodiode PD is connected to ground GND, and its cathode is connected to an input terminal of an amplifier 11 via an input terminal $P_{in}$. The photodiode PD generates a diode current IPD that corresponds to received light. The amplifier 11 converts the diode current IPD to a voltage Vout. A resistor Rf and a clamping circuit 12 are connected in parallel between the I/O terminals of the amplifier 11. The output voltage Vout of the amplifier 11 is supplied to the positive input terminal of a comparator 13 via an output terminal Pout and is supplied to the clamping circuit 12. The output voltage Vout may also be amplified by an amplifier having plural stages to compensate for an insufficient gain.

The clamping circuit 12 may be an npn type bipolar transistor Tr1. The transistor Tr1 has a base for receiving the output voltage Vout, a collector for receiving the voltage of a power supply Vcc, and an emitter connected to the input terminal $P_{in}$.

The comparator 13 receives the output voltage Vout supplied to its positive input terminal and a threshold voltage Vth supplied to its negative input terminal and converts the output voltage Vout to a digital signal. The digital signal is supplied to an internal circuit (not illustrated) of the optical communication device as a reception signal RX. The threshold voltage vth varies in accordance with the output voltage Vout.

The photodiode PD, as shown in FIG. 2, generates the diode current IPD that corresponds to the received light. The amplifier 11 converts the diode current IPD to the output voltage Vout. At this time, the output voltage Vout is given by the following equation.

$$\text{Vout} = IPD \times Rf$$

In other words, the output voltage Vout can be obtained by multiplying the diode current IPD by the resistance of the resistor Rf. The current-to-voltage conversion rate (so-called transformer impedance) of the amplifier 11 is substantially equal to the resistance of the resistor Rf. The comparator 13 converts the output voltage Vout to the digital signal (reception signal) RX.

When the diode current IPD increases, the inter-terminal voltage of the resistor Rf increases. When the diode current IPD exceeds a predetermined value and the inter-terminal voltage of the resistor Rf exceeds the voltage VBE between the base and emitter of the transistor Tr1 (IPD×Rf>VBE), the transistor Tr1 is turned on. Hereupon, the voltage of the power supply Vcc is supplied to the input terminal of the amplifier 11 via the transistor Tr1, the inter-terminal voltage of the resister Rf drops, and the output voltage Vout of the amplifier 11 is substantially clamped to the voltage VBE between the base and the emitter. Thus, when the output voltage Vout increases, the output voltage Vout is clamped to the predetermined clamping voltage VCL (VBE) by the clamping circuit 12.

The transformer impedance and the operation point of the clamping circuit 12 are set by the single resistor Rf. However, when the resistor Rf has a relatively high resistance in order to improve the transformer impedance, following disadvantages (a) and (b) arise.

(a) Disadvantage in High-speed Communication

The operation delay time of the transistor Tr1 is prolonged as the resistance of the resistor Rf increases. Accordingly, when the level of the received light and the diode current IPD are high, the clamping operation of the clamping circuit 12 is delayed. As a result, as shown in FIG. 2, when the output voltage Vout rises, an overshoot is generated and the signal waveform of the output voltage Vout is disturbed. Further, because of the large resistance of the resistor Rf, the falling edge of the output voltage Vout becomes slow, and the comparator 13 outputs a reception signal having a long H-level width.

(b) Disadvantage when a Direct Current Component is Contained in the Diode Current IPD When natural light is contained in the received light, as shown in FIG. 3, the diode current IPD contains a direct current component IPD-DC. In other words, the diode current IPD is offset by the direct current component IPD-DC. In this case, the output voltage Vout tend to be clamped by the direct current component IPD-DC. That is, the output voltage Vout that should not be clamped is clamped. Accordingly, the output voltage Vout is not obtained accurately and the comparator 13 outputs an erorrneous reception signal RX.

Optical communication devices are installed in electronic devices, such as personal computers, PDA (personal digital assistants), and digital still cameras. To reduce the power consumption of such optical communication devices, an optical communication device that automatically adjusts transmission output levels according to certain factors, such as the communication distance and communication state is proposed. FIG. 4 is a schematic block diagram of a conventional optical communication device 60. The optical communication device 60 includes a receiving circuit 210a and a transmitting circuit 210b. The receiving circuit 210a has a photodiode 211, an amplifier 212, and a comparator 213. The transmitting circuit 210b has a current driver 214 and a light-emitting diode 215.

The current driver 214 converts a transmission signal TX from an internal circuit to a current signal and amplifies the current signal to generate a transmission current Idrv. The light-emitting diode 215 repeats emission and extinction according to the transmission current Idrv. When the emission level of the photodiode 211 is high, an emission control unit 216 determines that the communication distance is short or the communication state is good and controls the current driver 214 so that the emission level of the light-emitting diode 215 decreases. When the received light level is low, the emission level control unit 216 determines that the communication distance is far or the communication state is not preferable and controls the current driver 214 so that the emission level of the light-emitting diode 215 increases.

Such control reduces the power consumption of the optical communication device 210.

Specifically, the emission level control unit 216 includes an emission level detection circuit 216a, a control circuit 216b, an arithmetic circuit 216c, and an emission level adjustment circuit 216d. The emission level detection circuit 216a receives a voltage signal VA of the amplifier 212 and supplies a detection signal SG1 that corresponds to the level of the voltage signal VA to the control circuit 216b. The arithmetic circuit 216c receives the detection signal SG1 via the control circuit 216b and calculates the level of the received light. The arithmetic circuit 216c further determines the communication distance and the communication state based on the received light level and determines the emission level and emission timing of the light-emitting diode 215. The control circuit 216b supplies a control signal SG2 to the emission level adjustment circuit 216d based on the determined emission level and emission timing. The emission level adjustment circuit 216d supplies an adjustment signal SG3 to the current driver 214 in accordance with the control signal SG2. The current driver 214 generates the transmission current Idrv while adjusting the self amplification factor in accordance with the adjustment signal SG3.

However, it takes time to calculate the emission level based on the received light level. In particular, the level of the received light easily varies according to the communication distance, the angle of receiving plane, and disturbances. In such a case, calculation of the emission level takes a very long time and high-speed processing of the optical communication device 210 is prevented.

It is an object of the present invention to provide a receiving circuit which generates an accurate voltage signal based on received light.

It is a second purpose of the present invention to provide an optical communication device for enabling high-speed processing while adjusting transmission output levels.

SUMMARY OF THE INVENTION

In a first aspect of the present invention, there is provided a receiving circuit including a light receiving element for generating a current signal that corresponds to received light. A current distribution circuit is connected to the light receiving element and distributes the current signal to first and second current signals in accordance with a predetermined distribution ratio. A first amplifier is connected to the current distribution circuit and converts the first current signal to a first voltage signal. A second amplifier is connected to the current distribution circuit and converts the second current signal to a second voltage signal. A current control circuit is connected to the light receiving element and the second amplifier and controls the amount of current of the first current signal in accordance with the second voltage signal.

In a second aspect of the present invention, there is provided a receiving circuit including a light receiving element for generating a current signal that corresponds to received light. A first amplifier is connected to the light receiving element and converts a first current signal that is a part of the current signal to a first voltage signal. A second amplifier is connected to the light receiving element and converts a second current signal that is a remaining part of the current signal to a second voltage signal. The first and second amplifiers include first and second transistors, connected to the light receiving element, the transistors having a size ratio that determine a distribution ratio of the first and second current signals. A current control circuit is connected to the light receiving element and the second amplifier and controls the amount of current of the first current signal in accordance with the second voltage signal.

In a third aspect of the present invention, there is provides a receiving circuit including a light receiving element and a first transistor and a first resistor connected in series between the light receiving element and a predetermined power supply. A second transistor and a second resistor are connected in series with each other and connected in parallel with the first transistor and the first resistor. The gates of the first and second transistors are connected to a reference voltage. A third transistor is connected in parallel with the second transistor and the second resistor. The gate of the third transistor is connected to a node between the second transistor and the second resistor.

In a fourth aspect of the present invention, there is provided an optical communication device including a transmitting circuit and a receiving circuit. The transmitting circuit includes a current driver for converting a transmission signal to a current signal and amplifying the current signal in accordance with a predetermined amplification factor, and a light-emitting diode, connected to the current driver, for emitting light in accordance with the amplified current signal. The receiving circuit includes a light receiving element for generating a reception current that corresponds to received light, an amplifier, connected to the light receiving element, for converting the reception current to a voltage signal, and a comparator, connected to the amplifier, for converting the voltage signal to a digital reception signal. A voltage holding circuit is connected to the amplifier and holds reception information including a peak voltage of the voltage signal. A transmission current control circuit is connected between the voltage holding circuit and the current driver, receives the reception information, and generates a control signal for controlling the predetermined amplification factor of the current driver based on the reception information.

In a fifth aspect of the present invention, there is provided a waveform shaping circuit including a current generation circuit for generating a current signal in response to a pulse signal and a differential circuit for converting the pulse signal to a differential waveform signal. A complementary current generation circuit is connected to the differential circuit and the current generation circuit and generates a complementary current signal that complements the waveform of the current signal in response to the differential waveform signal to generate a waveform-shaped pulse signal.

In a sixth aspect of the present invention, there is provided a waveform shaping circuit including first and second transistors connected in series between a potential of a pulse signal and a predetermined potential, the first transistor responsive to the pulse signal, and the second transistor responsive to a first reference voltage signal. A differential circuit converts the pulse signal to a differential waveform signal. Third and fourth transistors are connected in series between the potential of the pulse signal and the predetermined potential, the third transistor responsive to the differential waveform signal, and the fourth transistor responsive to a second reference voltage signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 18(a) and 18(b) are waveform diagrams showing the operation of the optical communication device of FIG. 17;

DETAILED DESCRIPTION OF THE PREFERRED EMBODIMENTS

Figure 1:
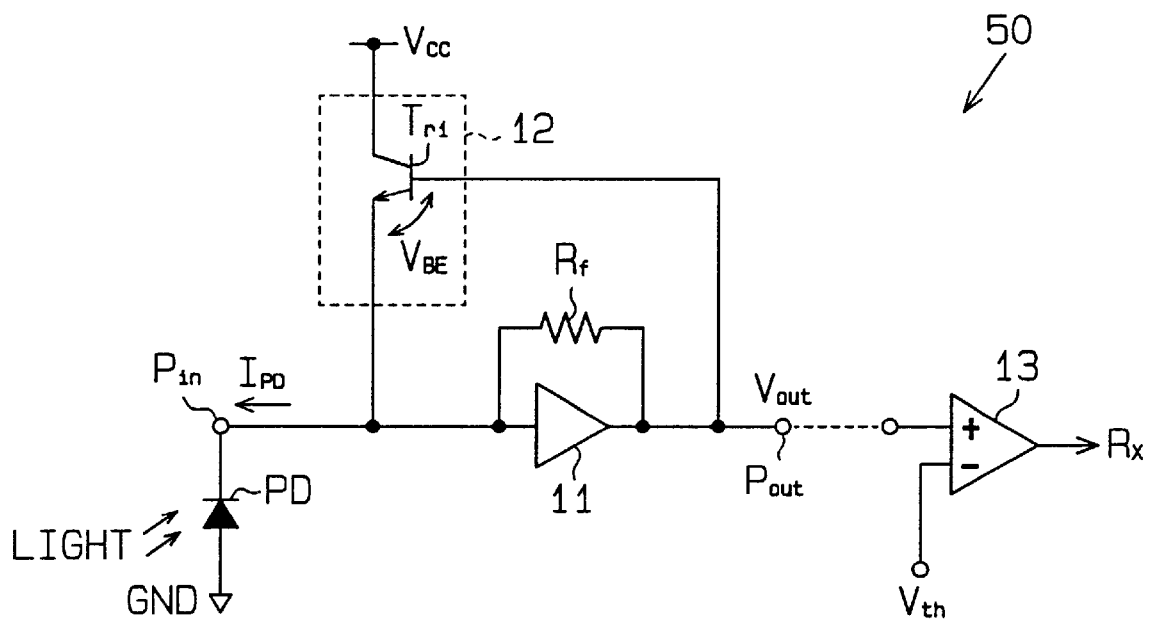
FIG. 1 is a circuit diagram of a conventional receiving circuit.
Figure 2:
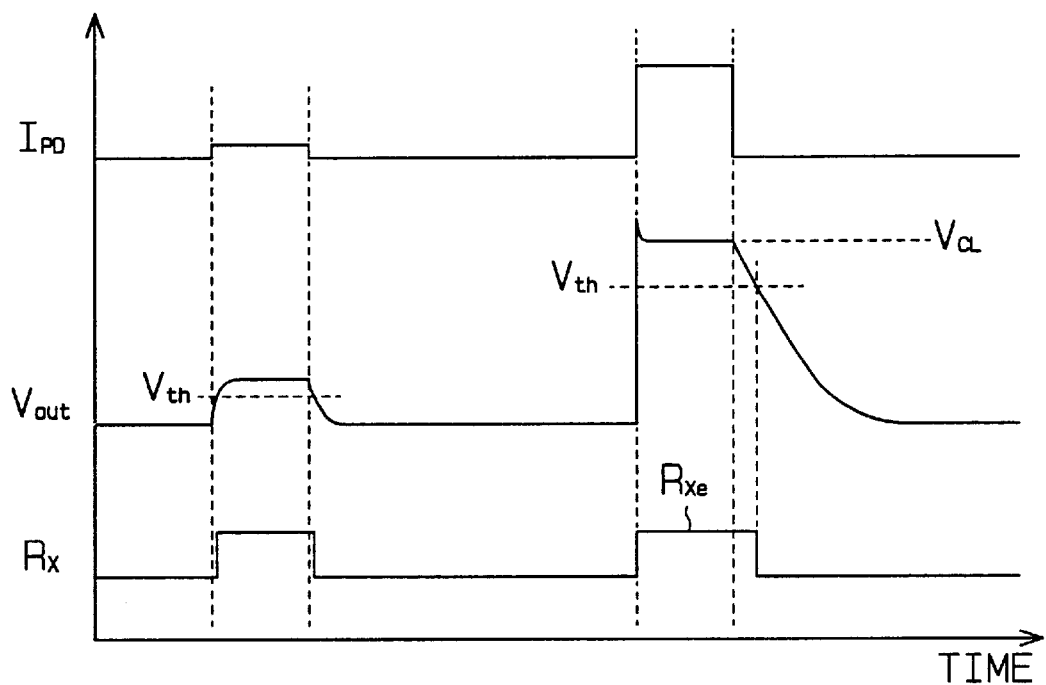
FIG. 2 is a waveform diagram showing the operation of the receiving circuit of FIG. 1.
Figure 3:
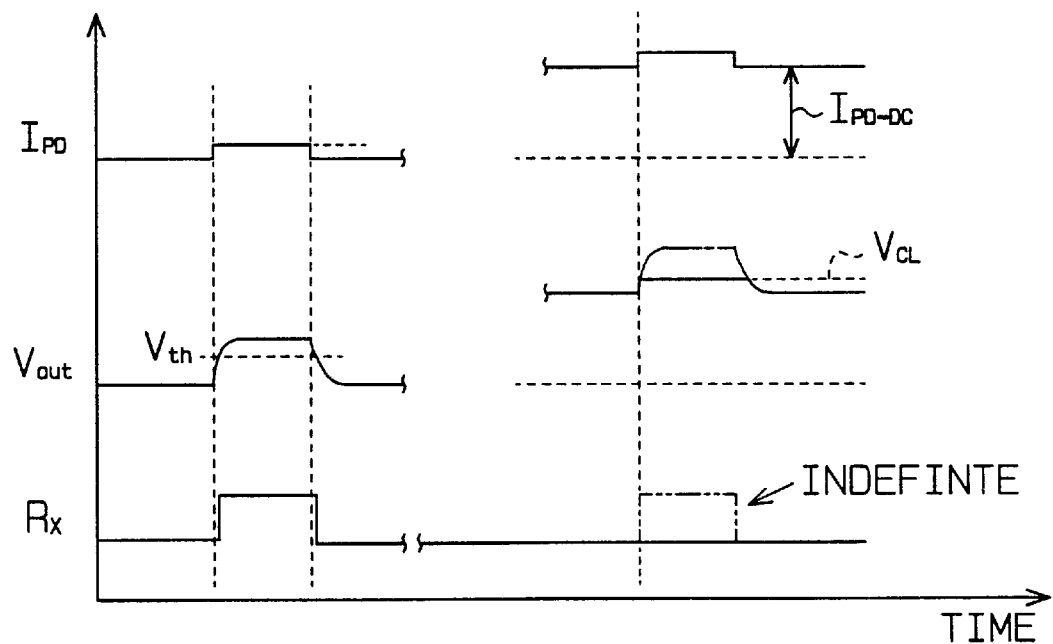
FIG. 3 is a waveform diagram showing the operation of the receiving circuit of FIG. 1.
Figure 4:
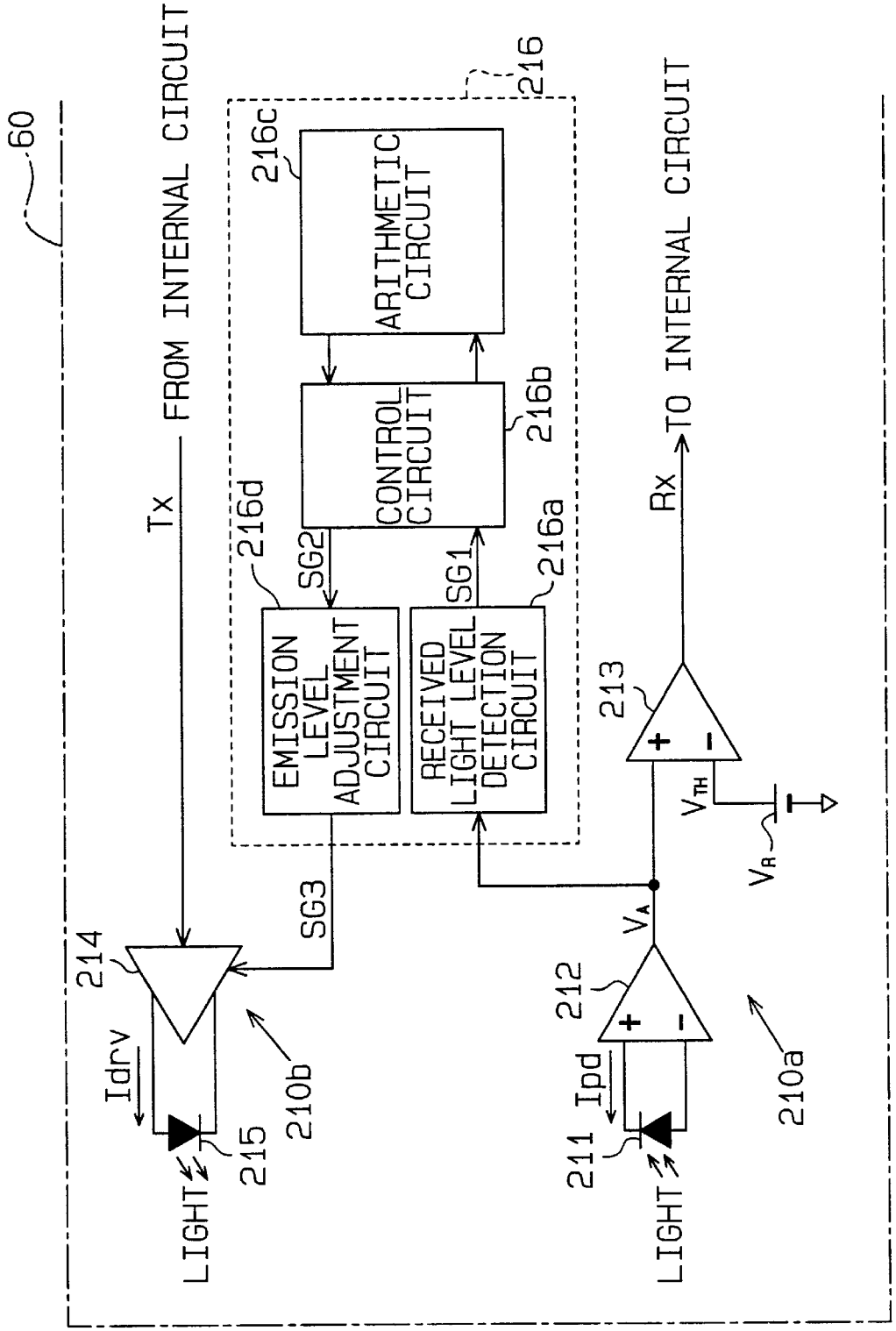
FIG. 4 is a schematic block diagram of a conventional optical communication device.

In the drawings, like numerals are used for like elements throughout.

First Embodiment

Figure 5:
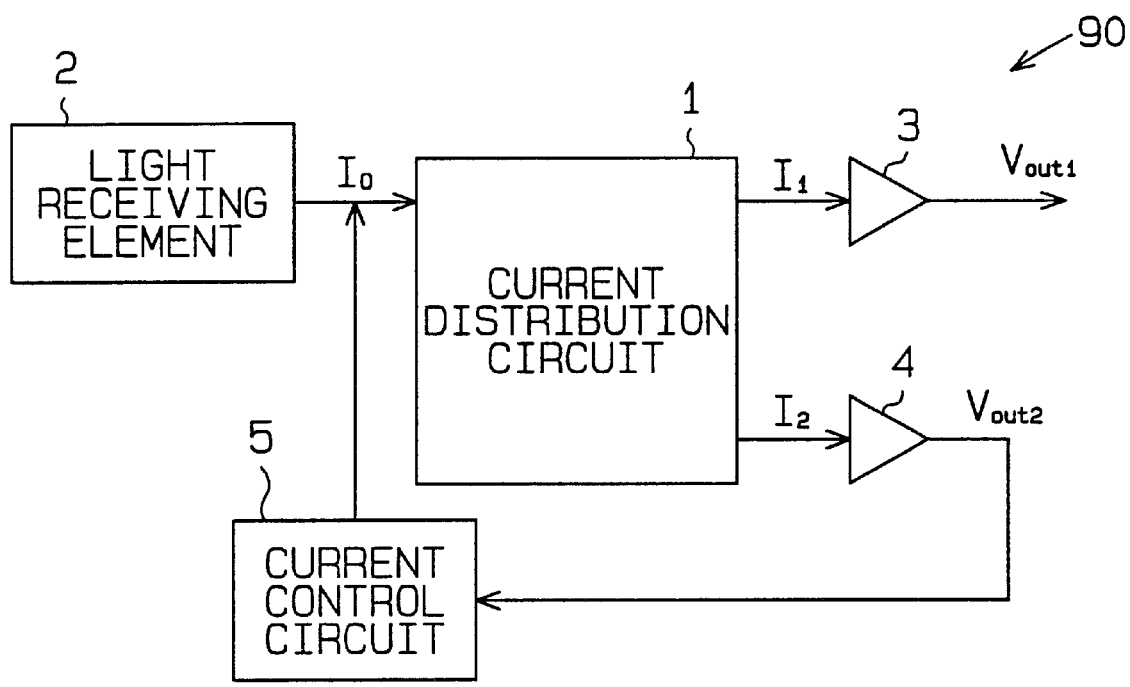
FIG. 5 is a schematic block diagram of a receiving circuit according to a first embodiment of the present invention.

FIG. 5 is a schematic block diagram of a receiving circuit 90 according to a first embodiment of the present invention. The receiving circuit 90 includes a current distribution circuit 1, a light receiving element 2, first and second amplifiers 3 and 4, and a current control circuit 5. The current distribution circuit 1 receives a receiving current signal I0 from the light receiving element 2 and distributes the receiving current signal I0 to first and second current signals I1 and I2. The first amplifier 3 converts the first current signal I1 to a first output voltage signal Vout1. The second amplifier 4 converts the second current signal I2 to a second output voltage signal Vout2. The current control circuit 5 receives the second output voltage Vout2 from the second amplifier 4 and controls the amount of current of the received light current signal I0. By changing the gain of the first amplifier 3, the current-to-voltage conversion rate of the amplifier 3 is set. By changing the gain of the second amplifier 4 and the current distribution ratio of the current distribution circuit 1, the operation point of the current control of the current control circuit 5 is set. Accordingly, because the current-to-voltage conversion rate and the operation point of current control are set separately, an accurate voltage signal based on received light is generated.

Second Embodiment

Figure 6:
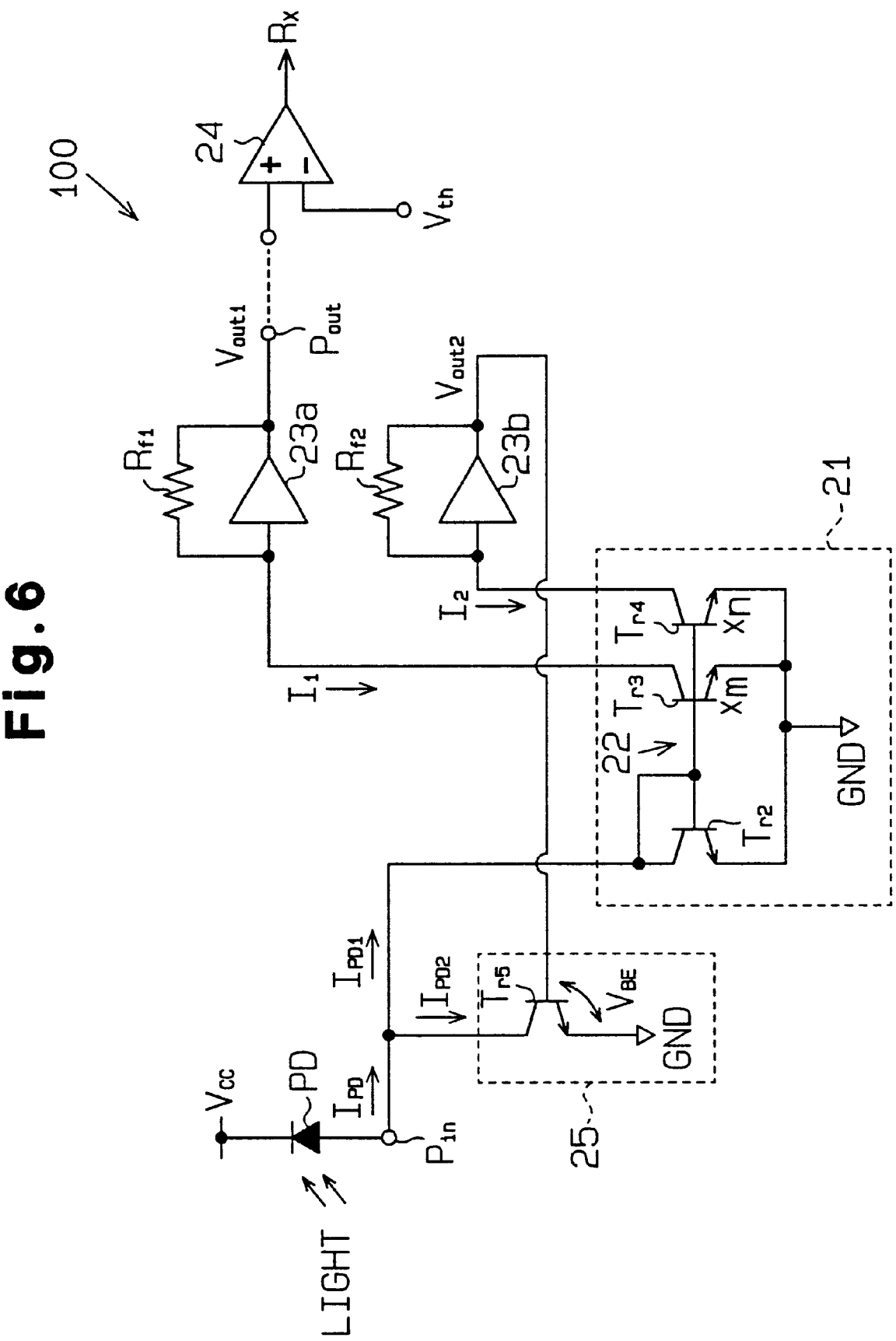
FIG. 6 is a circuit diagram of a receiving circuit according to a second embodiment of the present invention.

FIG. 6 is a diagram of a receiving circuit 100 according to a second embodiment of the present invention. The photodiode PD has a cathode connected to a power supply Vcc and an anode connected to an input distribution circuit 21 via an input terminal $P_{in}$. The anode of the photodiode PD may be connected to ground GND, and the cathode may be connected to the input terminal $P_{in}$. In this case, the diode current IPD supplied from the input terminal $P_{in}$ becomes negative.

The diode current IPD of the photodiode PD is supplied to the input terminal $P_{in}$. When a clamping circuit 25 operates, the diode current IPD is distributed to a current IPD1 provided to the input distribution circuit 21 and a current IPD2 flowing in the clamping circuit 25. The input distribution circuit 21 distributes the current IPD1 to the first and second input currents I1 and I2.

The input distribution circuit 21 preferably includes three npn type bipolar transistors Tr2 to Tr4. The bases of the transistors Tr2 to Tr4 are connected together and to the collector of the transistor Tr2. The emitters of the transistors Tr2 to Tr4 are connected to ground GND. The transistor Tr2 and the transistors Tr3 and Tr4 form a current mirror circuit 22. The transistors Tr3 and Tr4 have different sizes. The size ratio (mirror ratio) of the transistors Tr3 to Tr4 is m to n.

The current IPD1 is supplied to the collector of the transistor Tr2, and the transistors Tr3 and Tr4 generate the collector currents (i.e., the first and second input currents I1 and I2) that correspond to the currents IPD1 and IPD2, respectively. The current ratio of the first and second input currents I1 to I2 is m to n in accordance with the size ratio (mirror ratio) of the transistors Tr3 to Tr4.

A first amplifier 23a converts the first input current I1 to a first output voltage Vout1. A resistor Rf1 is connected between the I/O terminals of the first amplifier 23a. The first output voltage Vout1 is supplied from the output terminal of the first amplifier 23a to the input terminal of the comparator 24. When the gain of the first output voltage Vout1 is insufficient, the first output voltage Vout1 may be supplied to the input terminal of the comparator 24 via a plurality of amplifiers.

A second amplifier 23b converts the second input current I2 to a second output voltage Vout2 and supplies the second output voltage Vout2 to the clamping circuit 25. A resistor Rf2 is connected between the I/O terminals of the second amplifier 23b.

The clamping circuit 25 preferably includes an npn type bipolar transistor Tr5. The transistor Tr5 has a base for receiving the second output voltage Vout2, a collector connected to the input terminal $P_{in}$, and an emitter connected to ground GND. By turning on the transistor Tr5, the current IPD2 is generated and the current IPD1 decreases by the current IPD2.

The comparator 24 receives the first output voltage Vout1 at a positive input terminal and receives a threshold voltage Vth at a negative input terminal. The threshold voltage Vth varies according to the first output voltage Vout1. The comparator 24 converts the first output voltage Vout1 to a digital signal (i.e., a reception signal RX) using the threshold voltage Vth.

Figure 7:
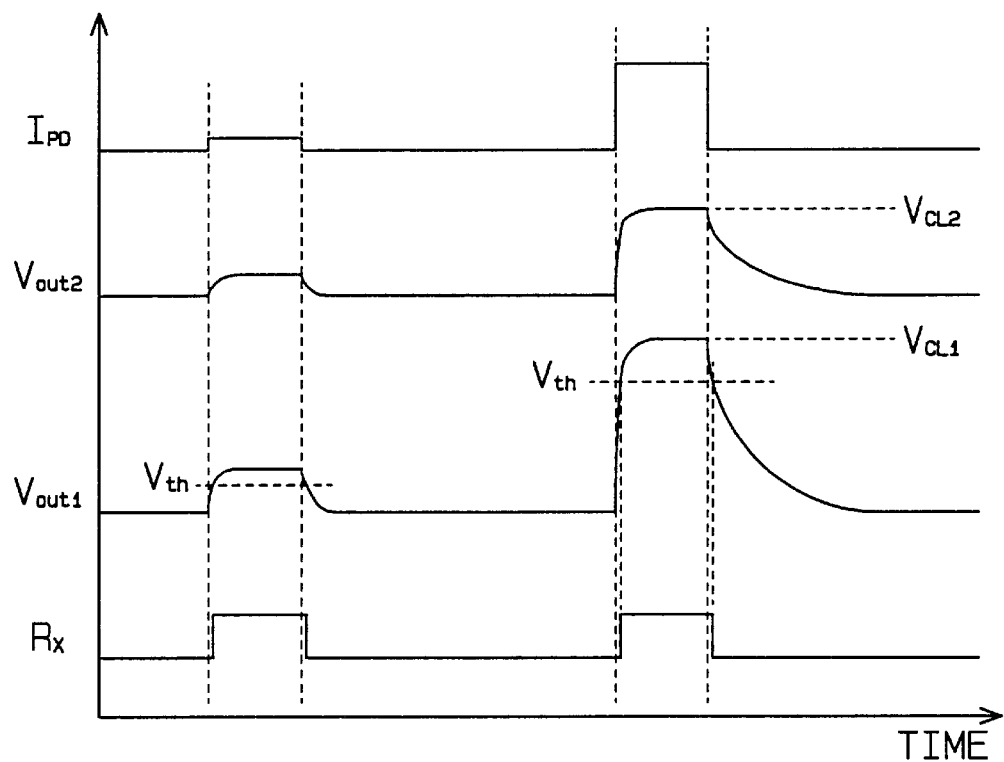
FIG. 7 is a waveform diagram showing the operation of the receiving circuit of FIG. 6.

FIG. 7 is a waveform diagram showing the operation of the receiving circuit 100. The diode current IPD is generated by the photodiode PD based on received light. The diode current IPD (current IPD1) is distributed to the first and second input currents I1 and I2 based on the mirror ratio (I1 to I2=m to n) of the current mirror circuit 22.

The first amplifier 23a converts the first input current I1 to the first output voltage Vout1. The first output voltage Vout1 is given by Vout1=I1×Rf1. The first output voltage Vout1 is obtained by multiplying the first input current I1 by the resistance of the resistor Rf1. The current-to-voltage conversion rate (so-called transformer impedance) of the first amplifier 23a is substantially equal to the resistance of the resistor Rf1. The comparator 24 converts the first output voltage Vout1 to the reception signal RX.

The second amplifier 23b converts the second input current I2 to the second output voltage Vout2. The second output voltage Vout2 is given by Vout2=I2×Rf2. The second output voltage Vout2 is obtained by multiplying the second input current I2 by the resistance of the resistor Rf2. The current-to-voltage conversion rate (so-called transformer impedance) of the second amplifier 23b is substantially equal to the resistance of the resistor Rf2.

When the current IPD1 increases, the second input current I2 also increases and the inter-terminal voltage of the resistor Rf2 increases. When the second input current I2 exceeds a predetermined value and the inter-terminal voltage of the resistor Rf2 exceeds the voltage VBE between the base and emitter of the transistor Tr5 (part of I2×Rf2>VBE) the transistor Tr5 is turned on. Hereupon, a part of the diode current IPD (current IPD2) flows to ground GND via the transistor Tr5, the current IPD1 decreases, and the first and second input currents I1 and I2 also decrease. Subsequently, when the second output voltage Vout2 drops equal to or below the voltage VBE between the base and emitter of the transistor Tr5, the transistor Tr5 is turned off. By repeating the on/off operation of the transistor Tr5, the current IPD1 is maintained constant and the first output voltage Vout1 is also maintained constant. That is, when the current increases, the second output voltage Vout2 is substantially clamped to the voltage VBE between the base and emitter and the first output voltage Vout1 is also clamped to a predetermined voltage VCL1.

The clamping voltage VCL1 of the first output voltage Vout1 is set by the mirror ratio of the current mirror circuit 22 and the resistors Rf1 and Rf2. That is, the clamping voltage VCL1 is obtained according to the following equation.

$$VCL1=VCL2/k$$

Where, VCL2 is the clamping voltage (VBE) of the second output voltage Vout2 and k is a constant. The constant k is obtained using the mirror ratio m:n and the resistors Rf1 and Rf2 according to the following equation.

$$K=(n \times Rf2)/(m \times Rf1)$$

As described above, the transformer impedance of the first amplifier 23a is set by the resistor Rf1, and the clamping voltage VCL1 of the first output voltage Vout1 is set by the mirror ratio m:n and the resistor Rf2. That is, the transformer impedance and the clamping voltage VCL1 are separately set by adjusting the resistors Rf1 and Rf2 and the mirror ratio m:n. Accordingly, even if the resistance of the resistor Rf1 is increased in order to improve the transformer impedance of the first amplifier 23a, the clamping operation of the clamping circuit 25 is not delayed. As a result, as shown in FIG. 7, the overshooting of the first output voltage Vout1 is prevented, the first output voltage Vout1 quickly drops, and the accurate reception signal RX is output from the comparator 13.

Figure 8:
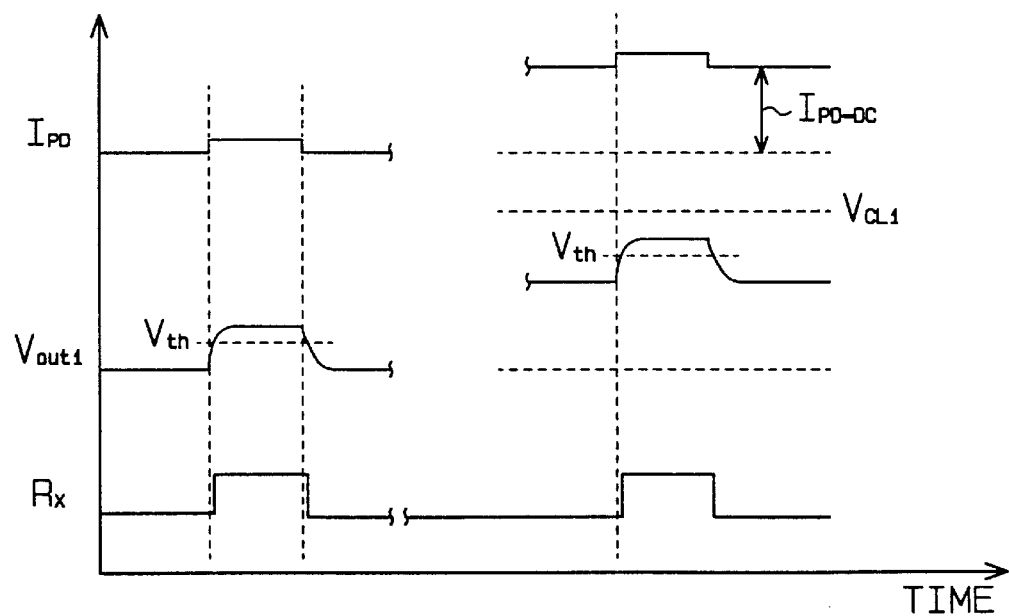
FIG. 8 is a waveform diagram showing the operation of the receiving circuit of FIG. 6.

FIG. 8 is a waveform diagram showing the operation of the receiving circuit 100 when the direct current component IPD-DC is contained in the photodiode current IPD. As described above, the clamping voltage VCL1 of the first output voltage Vout1 is set by VCL1=VCL2/k. When the constant k is lower than "1", the clamping voltage VCL1 becomes higher than a clamping voltage VCL2 (VBE). Accordingly, when the clamping voltage VCL1 is higher than the clamping voltage VCL2, the first output voltage Vout1 containing the direct current component IPD-PC is not clamped normally but is output from the first amplifier 23a. Consequently, the first output voltage Vout1 obtained is accurate.

Third Embodiment

Figure 9:
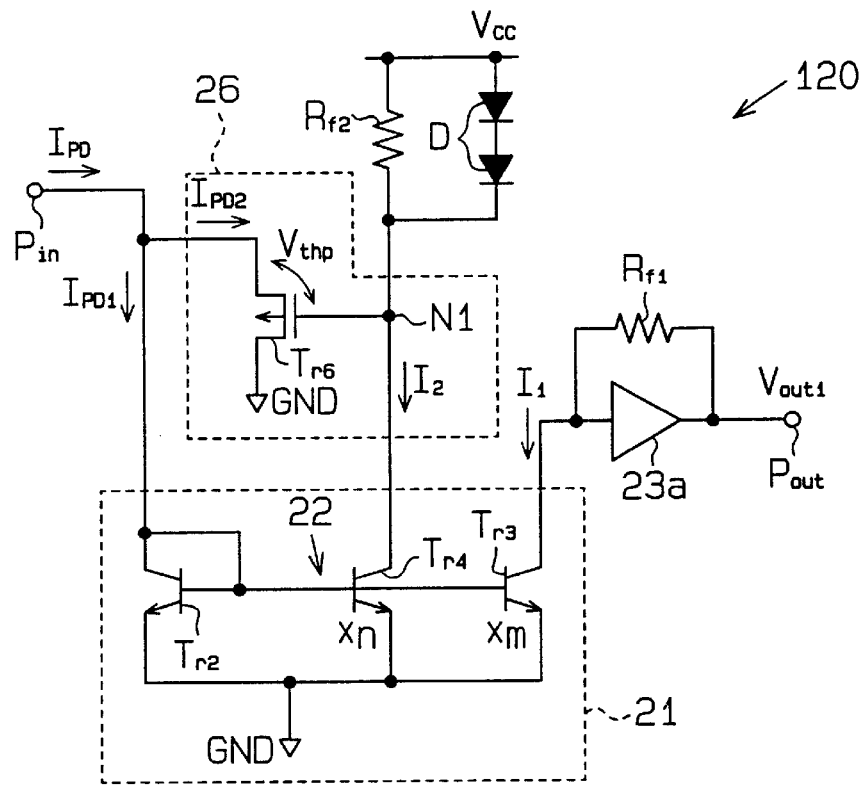
FIG. 9 is a circuit diagram of a receiving circuit according to a third embodiment of the present invention.

FIG. 9 is a circuit diagram of a receiving circuit 120 according to a third embodiment of the present invention. In the third embodiment, two series connected diodes D and the resistor Rf2 are provided instead of the second amplifier 23b of FIG. 6 and a new clamping circuit 26 is provided.

The clamping circuit 26 preferably includes a PMOS transistor Tr6. The resistor Rf2 and the transistor Tr4 of the input distribution circuit 21 are connected in series between the high potential power supply Vcc and a low potential power supply Vdd (e.g., ground). The series connected diodes D are connected to the resistor Rf2 in parallel. A lower potential than the voltage of the high potential power supply Vcc by the forward voltage of the two diodes appears at a node N1 between the cathodes of the diodes D and the collector of the transistor Tr4. The potential (Vout2) at the node N1 is determined by the resistor Rf2. Accordingly, the resistor Rf2 and the two diodes D function in the same manner as the second amplifier 23b of FIG. 6. The PMOS transistor Tr6 has a source connected to the input terminal $P_{in}$ of the diode current IPD, a drain connected to ground GND, and a gate connected to the node N1.

The diode current IPD (current IPD1) generated by the photodiode PD is supplied to the input distribution circuit 21 and the current IPD1 is distributed to the first and second input currents I1 and I2 based on the mirror ratio (I1 to I2=m to n) of the current mirror circuit 22. The first amplifier 23a converts the first input current I1 to the first output voltage Vout1.

When the current IPD1 increases and the second input current I2 exceeds a predetermined value (i.e., the potential at the node N1 becomes lower than the source potential by the threshold voltage Vthp of the PMOS transistor Tr6), the transistor Tr6 is turned on. Hereupon, the current IPD2 flows to ground GND via the PMOS transistor Tr6 and the current IPD1 decreases. As a result, the first and second input currents I1 and I2 decrease. Subsequently, when the difference between the potential at the node N1 and the source potential goes equal to or below the threshold voltage Vthp, the PMOS transistor Tr6 is turned off. Thus, the current IPD1 is maintained constant by repeating the on/off operation of the PMOS transistor Tr6. As a result, the potential at the node N1 is substantially clamped to the threshold voltage Vthp of the PMOS transistor Tr6 and the first output voltage Vout1 of the first amplifier 23a is also clamped to a predetermined voltage.

The transformer impedance of the first amplifier 23a can be set by the resistor Rf1, and the clamping voltage VCL1 of the first output voltage Vout1 can be set according to the mirror ratio m:n of the current mirror circuit 22 and the resistor Rf2 of the clamping circuit 26.

In the third embodiment, the resistor Rf2 and the two diodes D function as the second amplifier 23b of FIG. 6 and their number is lower than the number of elements of the second amplifier 23b. Consequently, the configuration of the receiving circuit 120 is simplified.

Fourth Embodiment

Figure 10:
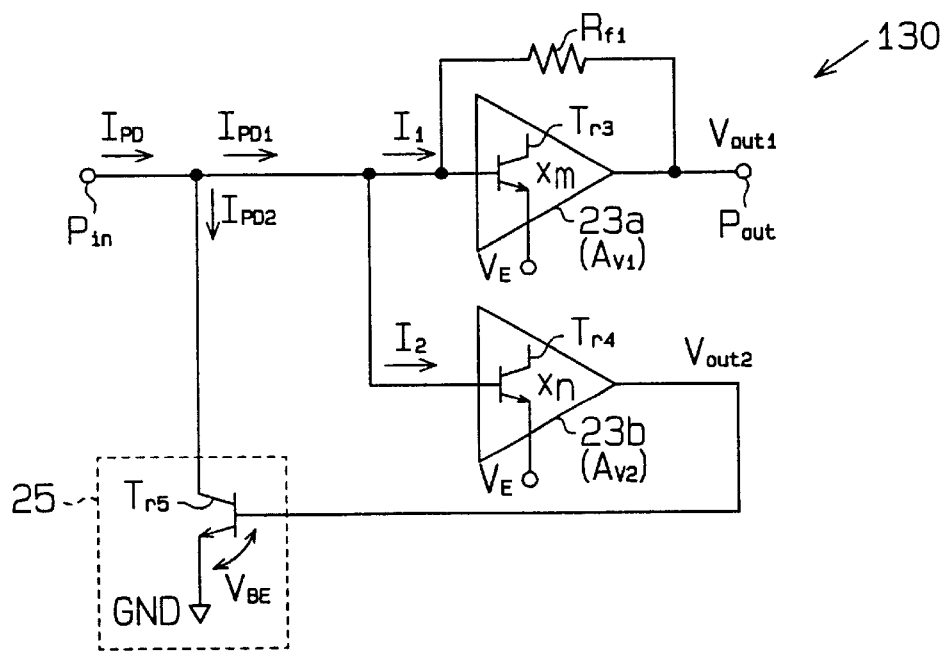
FIG. 10 is a circuit diagram of a receiving circuit according to a fourth embodiment of the present invention.

FIG. 10 is a circuit diagram of a receiving circuit 130 according to a fourth embodiment of the present invention. In the fourth embodiment, the input distribution circuit 21 and the resistor Rf2 of FIG. 6 are omitted and the first and second amplifiers 23a and 23b respectively include the transistors Tr3 and Tr4 that function as the input distribution circuit 21. The size ratio of the transistors Tr3 to Tr4 is m to n. An emitter potential VE is supplied to the emitters of the transistors Tr3 and Tr4. The diode current IPD (current IPD1) is distributed to the first and second input currents I1 and I2 based on the size ratio of the transistors Tr3 and Tr4 and the first and second input currents I1 and I2 are supplied to the bases of the transistors Tr3 and Tr4. Because the collector current ratio of the transistors Tr3 to Tr4 is m to n, the base current ratio is also m to n. Accordingly, the diode current IPD (current IPD1) is distributed to the first and second input currents I1 and I2 based on the size ratio of the transistors Tr3 and Tr4 (I1 to I2=m to n).

When the current IPD1 increases and the second input current I2 exceeds a predetermined value, the transistor Tr5 is turned on until the second output voltage Vout2 drops equal to or below the voltage VBE between the base and the emitter.

By repeating the on/off operation of the transistor Tr5, the current IPD1 is maintained constant and the first output voltage Vout1 is clamped to the predetermined voltage VCL1. The clamping voltage VCL1 of the first output voltage Vout1 is given by VCL1=VCL2/k. The constant k is given by the following.

$$K=(Av2 \times V2)/(Av1 \times V1)$$

Av1 and Av2 are the open loop gains of the first and second amplifiers 23a and 23b, respectively. V1 and V2 are input voltages of the first and second amplifiers 23a and 23b. Accordingly, the clamping voltage VCL1 of the first output voltage Vout1 is set according to the size ratio m:n of the transistors Tr3 and Tr4 and the open loop gains Av1 and Av2. Further, the transformer impedance of the first amplifier 23a is set according to the resistor Rf1.

In the third embodiment, since the input distribution circuit 21 is formed by the transistors Tr3 and Tr4, the number of elements of the receiving circuit 130 is reduced.

Fifth Embodiment

Figure 11:
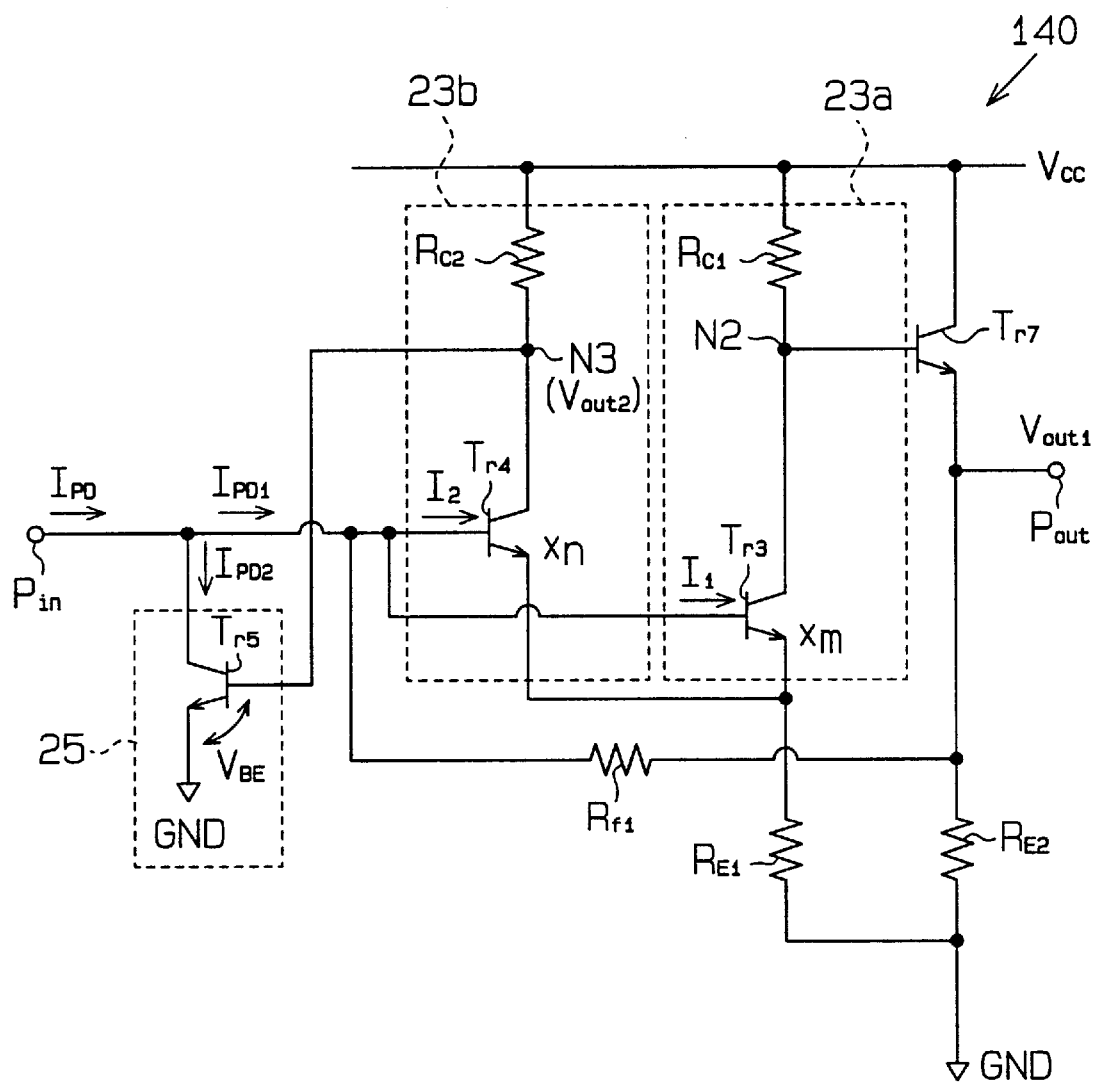
FIG. 11 is a circuit diagram of a receiving circuit according to a fifth embodiment of the present invention.

FIG. 11 is a circuit diagram of a receiving circuit 140 according to a fifth embodiment of the present invention. In the fifth embodiment, the first amplifier 23a includes the transistor Tr3 of FIG. 10 and a collector resistor Rc1. The second amplifier 23b includes the transistor Tr4 of FIG. 10 and a collector resistor Rc2.

The transistor Tr3 has a collector connected to the high potential power supply Vcc via the collector resistor Rc1, an emitter connected to ground GND via the emitter resistor RE1, and a base for receiving the diode current IPD (current IPD1). The transistor Tr4 has a collector connected to the power supply Vcc via the collector resistor Rc2, an emitter connected to ground GND via the emitter resistor RE1, and a base for receiving the diode current IPD (current IPD1).

An emitter follower that is preferably an npn type bipolar transistor Tr7 is connected to the output (a node N2 between the collector of the transistor Tr3 and the collector resistor Rc1) of the first amplifier 23a. The transistor Tr7 has a collector connected to the power supply Vcc, an emitter connected to ground GND via an emitter resistor RE2, and a base connected to the node N2. The first output voltage Vout1 is output from the emitter of the transistor Tr7. The resistor Rf1 is connected between the I/O terminals of the first amplifier 23a (i.e., between the base of the transistor Tr3 and the emitter of the transistor Tr7).

The transistor Tr5 of the clamping circuit 25 has a collector connected to the input terminal $P_{in}$, an emitter connected to ground GND, and a base connected to a node N3 between the collector of the transistor Tr4 and the collector resistor Rc2. The second output voltage Vout2 is output from the node N3.

When the current IPD1 increases and the second input current I2 exceeds a predetermined value, the transistor Tr5 is turned on until the potential (the second output voltage Vout2) at the node N3 drops equal to or below the voltage VBE between the base and the emitter. By repeating the on/off operation of the transistor Tr5, the current IPD1 is maintained constant and the first output voltage Vout1 is also clamped to the predetermined voltage Vout1.

The clamping voltage VCL1 of the first output voltage Vout1 is given by VCL1=VCL2/k, and the constant k is given by the following equation:

$$k=(Av2 \times v2)/(Av1 \times V1)$$

The open loop gains Av1 and Av2 are given by Av1 to Av2=(m×Rc1) to (n×Rc2) using the size ratio m:n of the transistors Tr3 and Tr4 and the collector resistors Rc1 and Rc2.

Accordingly, the constant k is given by the following equation:

$$k=(n \times Rc2)/(m \times Rc1)$$

The clamping voltage VCL1 of the first output voltage Vout1 is set using the size ratio m:n of the transistors Tr3 and Tr4 and the collector resistors Rc1 and Rc2. The transformer impedance of the first amplifier 23a can be set using the resistor Rf1.

Since the first and second amplifiers 23a and 23b is formed by the transistors Tr3 and Tr4 and the collector resistors Rc1 and Rc2, the number of elements of the receiving circuit 140 is reduced.

Sixth Embodiment

Figure 12:
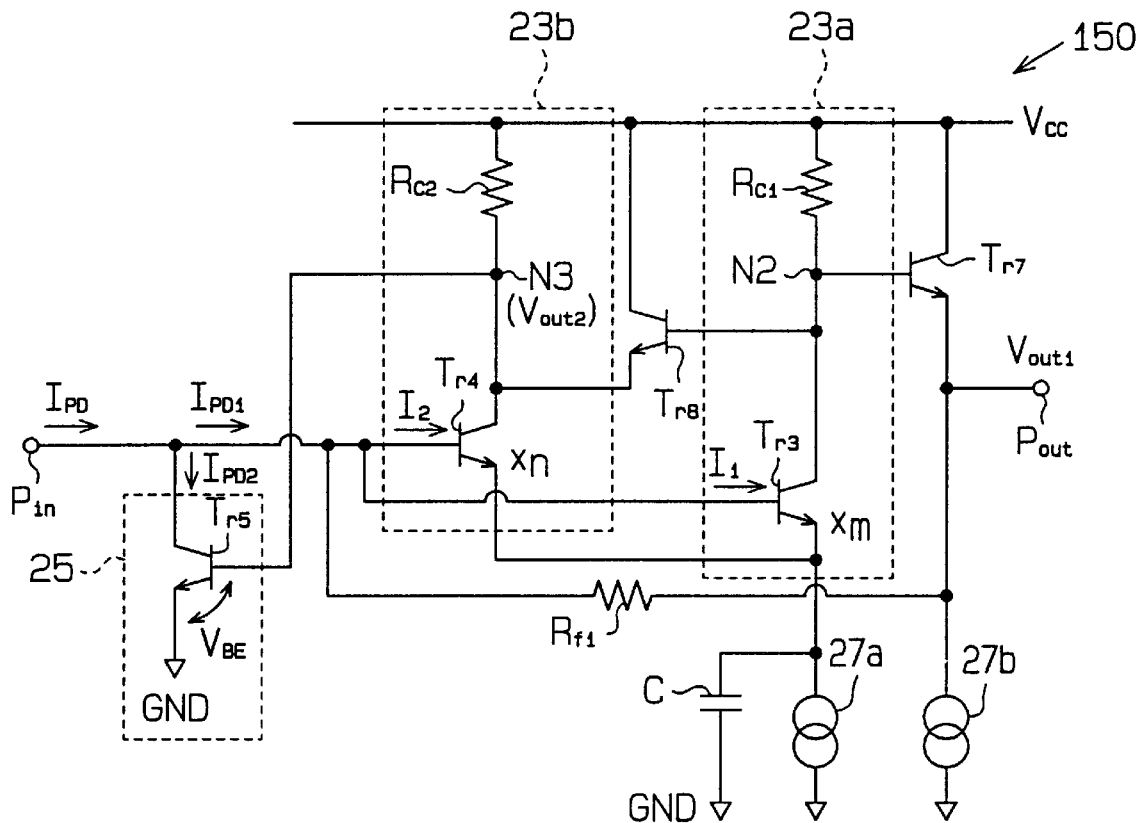
FIG. 12 is a circuit diagram of a receiving circuit according to a sixth embodiment of the present invention.

FIG. 12 is a circuit diagram of a receiving circuit 150 according to a sixth embodiment of the present invention. In the sixth embodiment, the emitter resistors RE1 and RE2 of FIG. 11 are replaced by constant current sources 27a and 27b, respectively. That is, the emitters of the transistors Tr3, Tr4, and Tr7 are connected to ground GND via the constant current sources 27a and 27b. Accordingly, the power supply voltage of the receiving circuit 150 hardly fluctuates.

A capacitor C is connected between the collector of the transistor Tr3 (collector of the transistor Tr4) and ground GND. The capacitor C eliminates the high frequency components of the emitter potentials of the transistors Tr3 and Tr4. In other words, the capacitor C operates as a high pass filter. Accordingly, a constant emitter potential is accurately obtained and the operations of the first and second amplifiers 23a and 23b is stable.

An npn type bipolar transistor Tr8 has an emitter connected to the node N3, a collector connected to the power supply Vcc, and a base connected to the node N2. The transistor Tr8 prevents the potential (second output voltage Vout2) at the node N3 from dropping due to a base current flowing in the transistor Tr5. Accordingly, the second output voltage Vout2 is stable.

Seventh Embodiment

Figure 13:
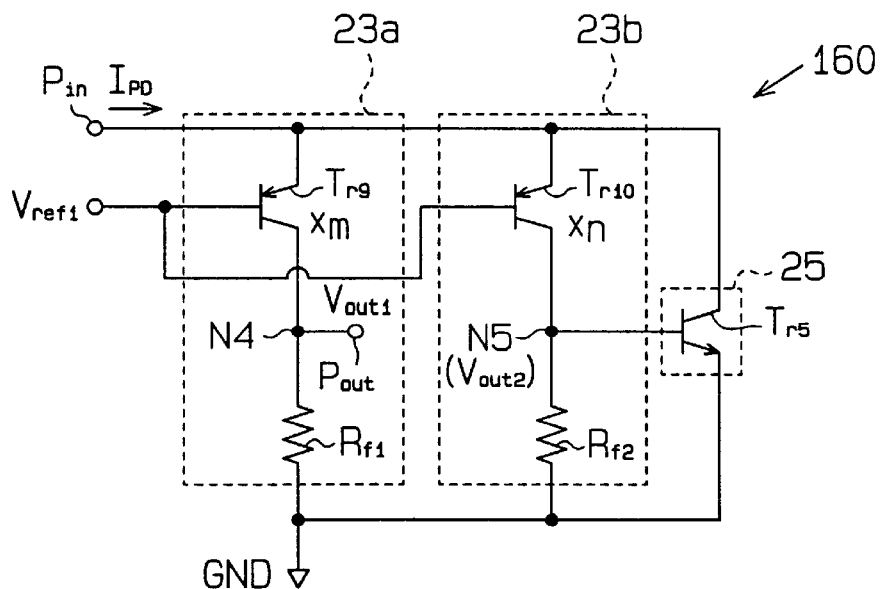
FIG. 13 is a circuit diagram of a receiving circuit according to a seventh embodiment of the present invention.

FIG. 13 is a circuit diagram of a receiving circuit 160 according to a seventh embodiment of the present invention. In the seventh embodiment, the first amplifier 23a includes a pnp type bipolar transistor Tr9 and the resistor Rf1 and the second amplifier 23b includes a pnp type bipolar transistor Tr10 and the resistor Rf2. The size ratio of the transistors Tr9 to Tr10 is m to n.

The transistors Tr9 and Tr10 have their emitters connected to the input terminal $P_{in}$, collectors connected to ground GND via the resistors Rf1 and Rf2, respectively, and their bases for receiving a reference voltage Vref1. A node N4 between the collector of the transistor Tr9 and the resistor Rf1 is connected to the output terminal Pout of a receiving circuit 170 (FIGS. 14a, 14b), and the first output voltage Vout1 is output from the node N4.

The transistor Tr5 of the clamping circuit 25 has a collector connected to the input terminal $P_{in}$, an emitter connected to ground GND, and a base connected to a node N5 between the collector of the transistor Tr10 and the resistor Rf2. The second output voltage Vout2 appears at the node N5.

The relationships between the first and second output voltages Vout1 and Vout2 are given as follows:

$$\text{Vout1 to Vout2} = (m \times Rf1) \text{ to } (n \times Rf2)$$

The clamping voltage VCL1 of the first output voltage Vout1 is given by VCL1=VCL2/k, and the constant k is given by k=(n×Rf2)/(m×Rf1) using the size ratio m:n of the transistors Tr9 and Tr10 and the resistors Rf1 and Rf2. Accordingly, the clamping voltage VCL1 of the first output voltage Vout1 can be set using the size ratio m:n of the transistors Tr9 and Tr10 and the resistors Rf1 and Rf2. Further, the transformer impedance of the first amplifier 23a is set in accordance with the resistor Rf1.

Eighth Embodiment

Figure 14A:
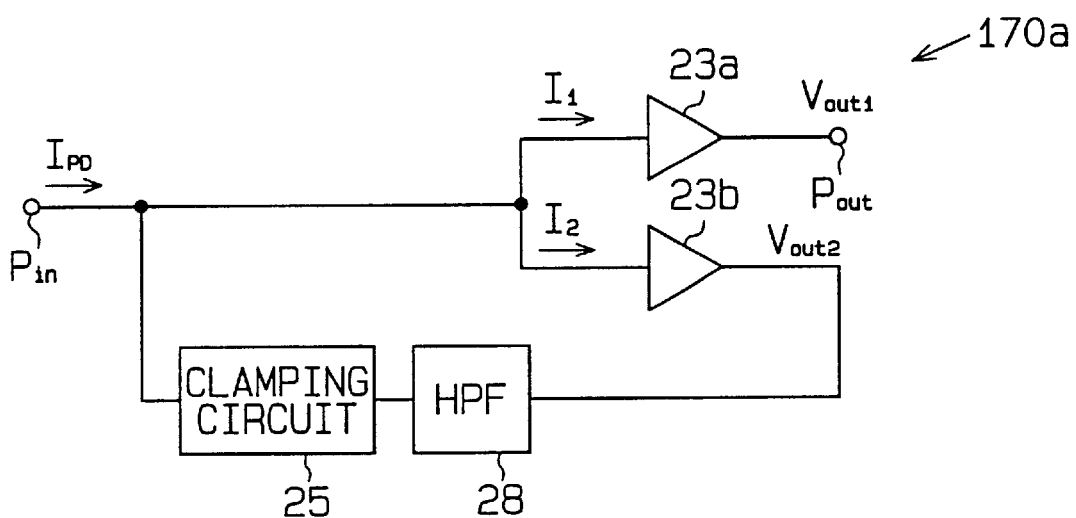
FIGS. 14(a) and 14(b) are circuit diagrams of a receiving circuit according to an eighth embodiment of the present invention.
Figure 14B:
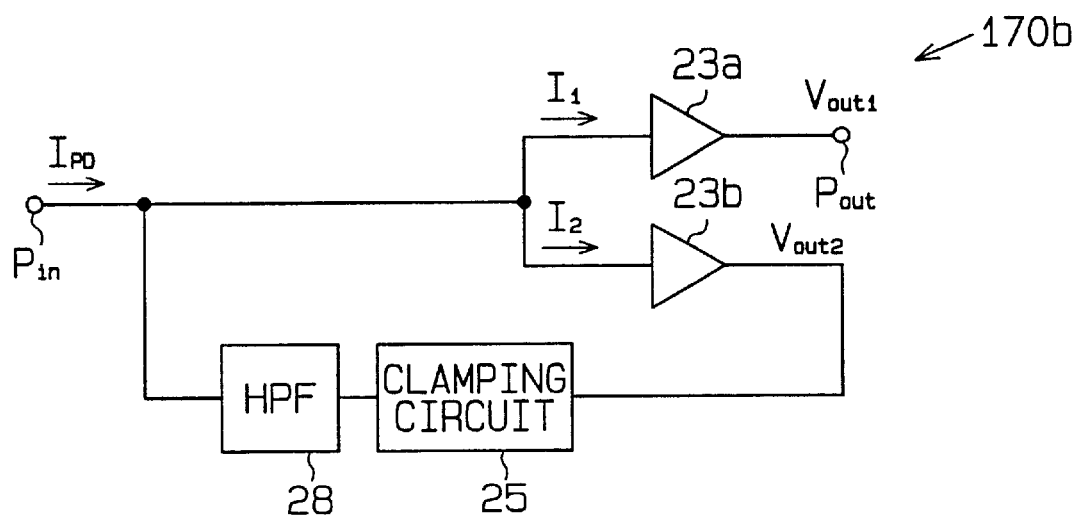

FIG. 14(a) is a schematic block diagram of a receiving circuit 170a according to an eighth embodiment of the present invention. In the eighth embodiment, a high pass filter (HPF) 28 is connected between the second amplifier 23b and the clamping circuit 25. The HPF 28 eliminates the direct current component IPD-DC and its nearby low frequency component included in the diode current IPB (second output voltage Vout2). Accordingly, the clamping operation of the clamping circuit 25 is performed accurately. In a receiving circuit 170b shown in FIG. 14(b), the high pass filter 28 may be connected between the clamping circuit 25 and the input terminal $P_{in}$. The eighth embodiment can be applied to the receiving circuits 100, 110, 120, 130, 140, and 150 of FIGS. 6 and 9, and FIGS. 10 to 13.

Ninth Embodiment

Figure 15:
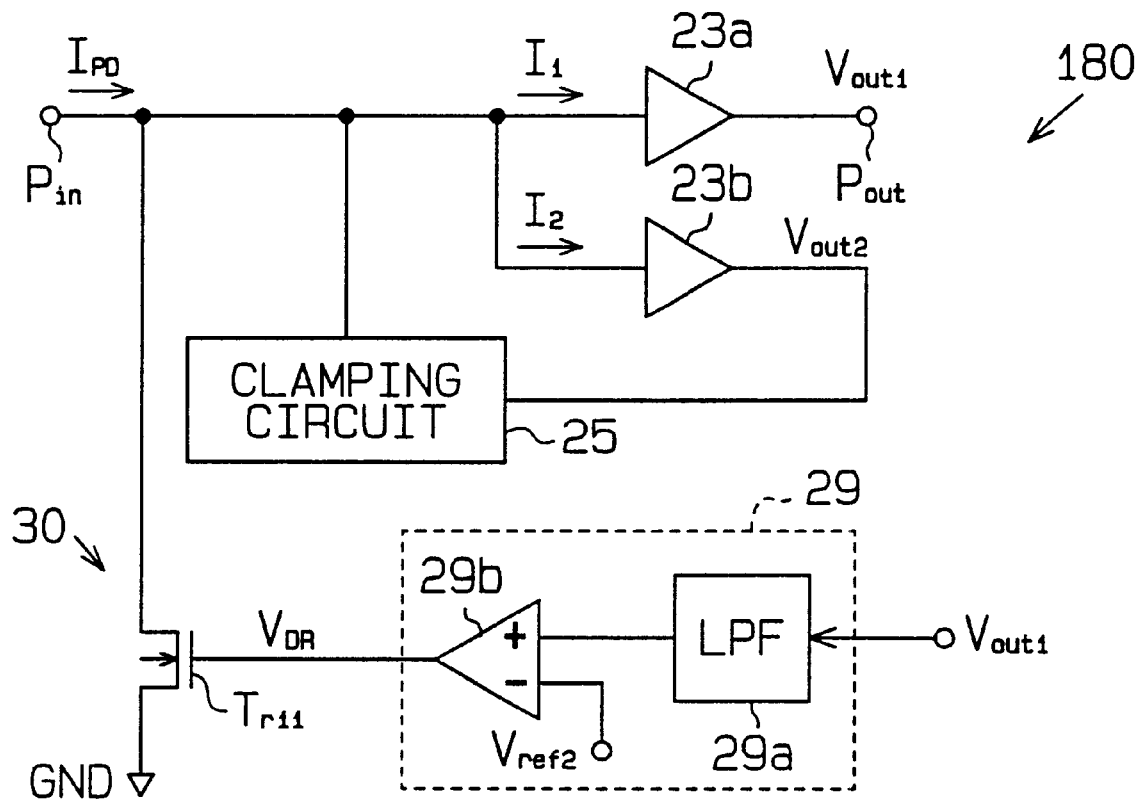
FIG. 15 is a circuit diagram of a receiving circuit according to a ninth embodiment of the present invention.

FIG. 15 is a schematic block circuit diagram of a receiving circuit 180 according to a ninth embodiment of the present invention. The receiving circuit 180 includes a current adjustment circuit 30 and a detection circuit 29 for detecting a low frequency component.

The detection circuit 29 preferably includes a low pass filter (LPF) 29a and a comparator 29b. The LPF 29a output signal has an H level when a direct current component is contained in the first output voltage Vout1. The comparator 29b receives the output signal from the LPF 29a at a positive input terminal and receives a reference voltage Vref2 at a negative input terminal. When the output signal having the H level is output from the LPF 29a, the comparator 29b supplies a detection signal VDR having the H level to the current adjustment circuit 30.

The current adjustment circuit 30 is preferably an NMOS transistor Tr11. The NMOS transistor Tr11 has a source connected to ground GND, a drain connected to the input terminal $P_{in}$, and a gate for receiving the detection signal VDR from the detection circuit 29. When the NMOS transistor Tr11 turns on in response to the detection signal VDR having the H level, the direct current component IPD-DC of the diode current IPD flows to ground GND via the NMOS transistor Tr11. The direct current component and its nearby low frequency component of the diode current IPD are eliminated by the detection circuit 29 and the current adjustment circuit 30. Accordingly, the clamping circuit 25 performs an accurate clamping operation.

The ninth embodiment can be applied to the receiving circuits 100, 110, 120, 130, 140, and 150 of FIG. 6 and 9, and FIGS. 10 to 13.

Tenth Embodiment

Figure 16:
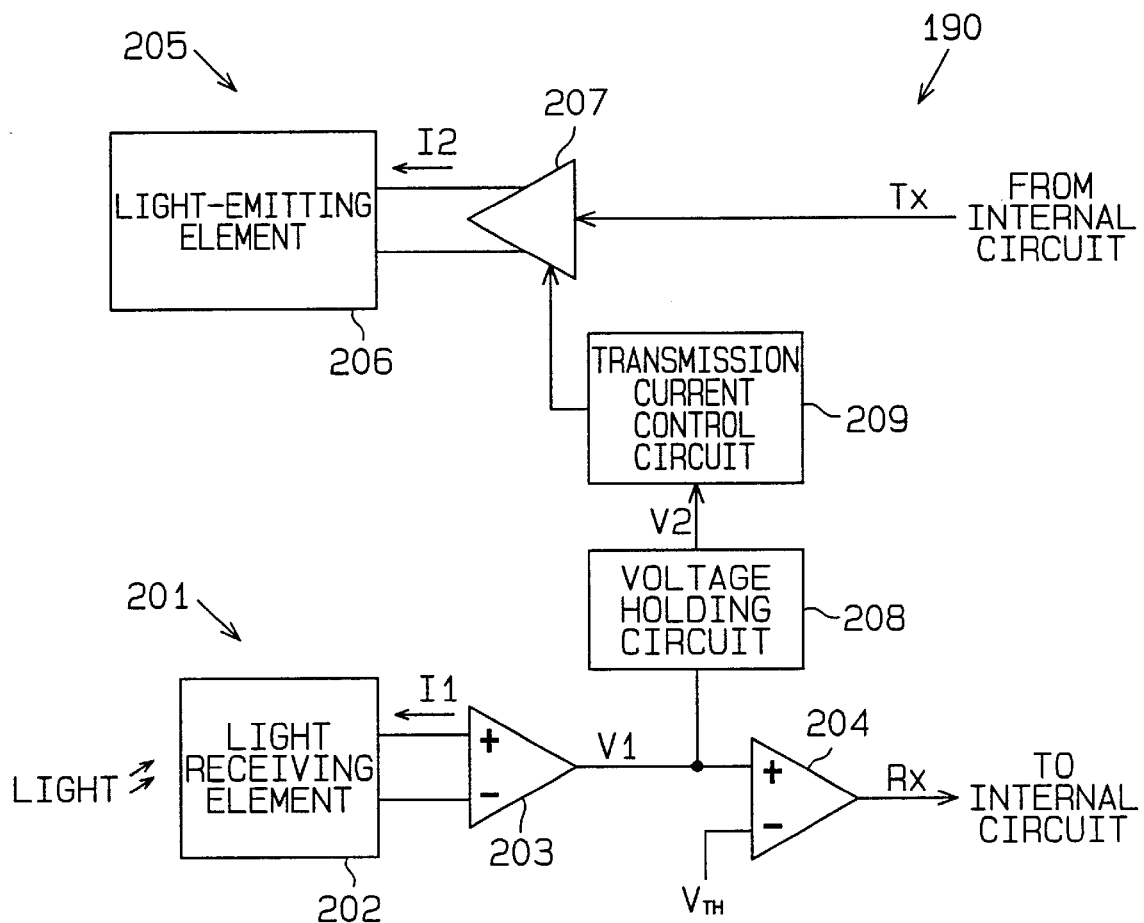
FIG. 16 is a schematic block diagram of an optical communication device according to a tenth embodiment of the present invention.

FIG. 16 is a schematic block diagram of an optical communication device 190 according to a tenth embodiment of the present invention. The optical communication device 190 includes a receiving circuit 201 and a transmitting circuit 205. The receiving circuit 201 includes a light receiving element 202 for generating the receiving current I1 that corresponds to received light, an amplifier 203 for converting the receiving current I1 to a voltage signal V1, and a comparator 204 for converting the voltage signal V1 to a digital reception signal RX using the threshold voltage Vth. The transmitting circuit 205 includes a current driver 207, which generates the transmission current I2 by converting a digital transmission signal TX from an internal circuit (not illustrated) to a current signal and amplifying the current signal, and a light-emitting element 206 which may be an LED for emitting light in accordance with the transmission current I2. A voltage holding circuit 208 is connected between the amplifier 203 and the comparator 204 and holds a peak voltage V2 of the voltage signal V1. A transmission current control circuit 209 is connected between the voltage holding circuit 208 and the current driver 207 and controls the amplification factor of the current driver 207 based on the peak voltage V2. The current driver 207 amplifies the current signal while changing the self-amplification factor by the control of the transmission current control circuit 209. An emission level according to the received light level (communication state) is obtained by such amplification factor control. Accordingly, the arithmetic operation of the emission level is not required. As a result, high-speed processing of the optical communication device 190 is achieved while adjusting the transmission output level.

Eleventh Embodiment

Figure 17:
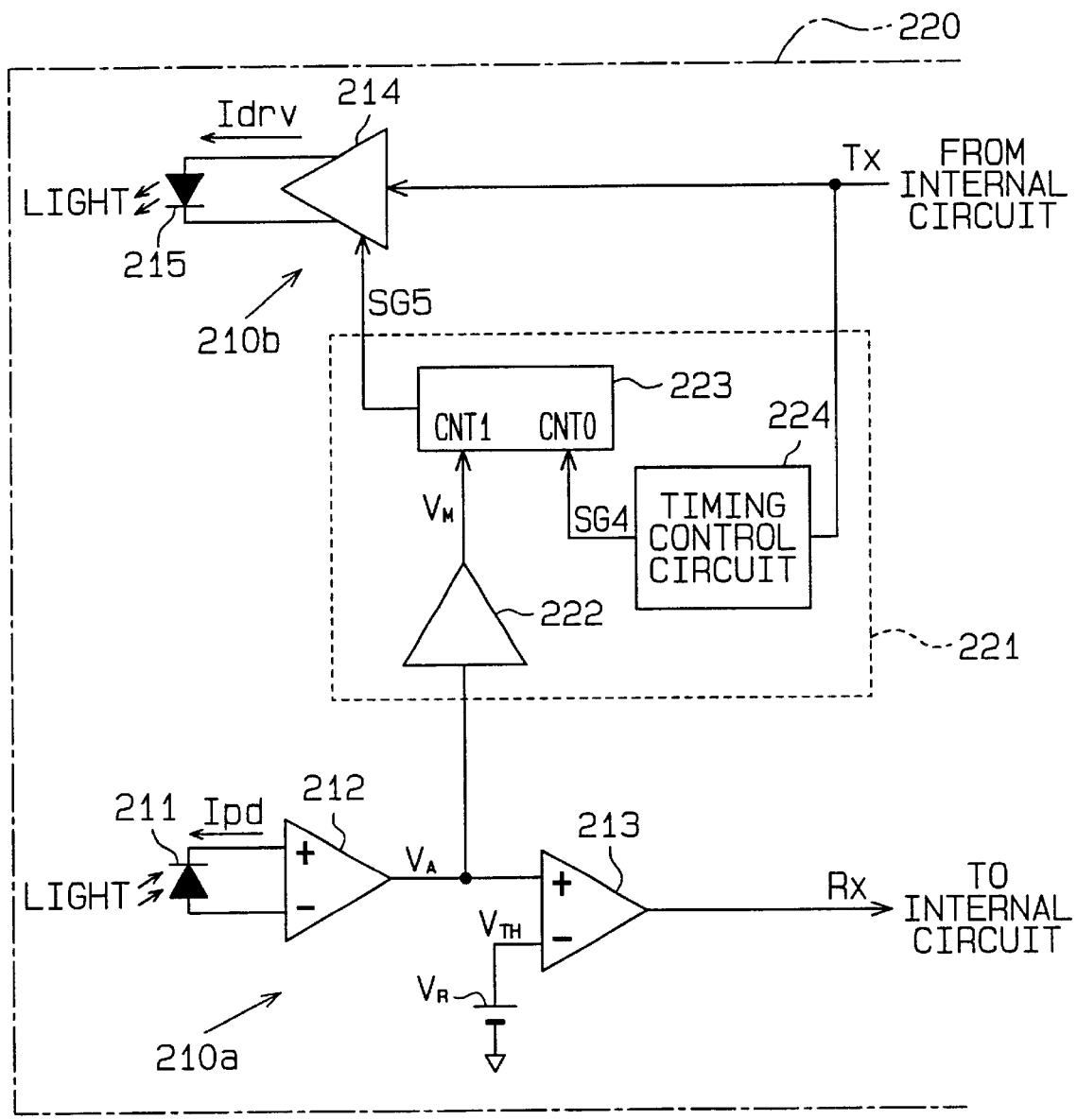
FIG. 17 is a schematic block diagram of an optical communication device according to an eleventh embodiment of the present invention.

FIG. 17 is a schematic block diagram of an optical communication device 220 according to an eleventh embodiment of the present invention. The optical communication device 220 includes a receiving circuit 210a, a transmitting circuit 210a, a voltage holding circuit 222, a transmission current control circuit 223, and a timing control circuit 224. The voltage holding circuit 222, the transmission current control circuit 223, and the timing control circuit 224 form an emission level control circuit 221. The receiving circuit 210a includes a photodiode 211, an amplifier 212, and a comparator 213. The transmitting circuit 210b includes a current driver 214 and a light-emitting diode 215. A semiconductor laser may be used instead of the light-emitting diode 215.

The voltage holding circuit 222, which is connected between the amplifier 212 and the comparator 213, receives the voltage signal VA from the amplifier 212, and holds a peak voltage VM of the voltage signal VA. The timing control circuit 224 receives the digital transmission signal TX from the internal circuit and generates a timing signal SG4 in accordance with the transmission signal TX. The timing signal SG4 rises to the H level after a time t1 has elapsed from the rise time of the transmission signal TX to the H level and falls to an L level when a time t2 in which the transmission signal TX falls from the time t1 has elapsed.

The transmission current control circuit 223 has a terminal CNT1 for receiving the holding voltage VM from the voltage holding circuit 222 and a terminal CNT0 for receiving the timing signal SG4 from the transmission current control circuit 223. The transmission current control circuit 223 generates an adjustment signal SG5 using the holding voltage VM and the timing signal SG4 and supplies the adjustment signal SG5 to the current driver 214.

Specifically, when the timing signal SG4 has the L level, the current driver 214 generates the adjustment signal SG5 to have the maximum amplification factor. When the timing signal SG4 has the H level, the adjustment signal SG5 is generated so that the amplification factor of the current driver 214 is inversely proportional to the holding voltage VM. Accordingly, until the time t1 elapses from the rise time of the transmission signal TX to the H level, the amplification factor of the current driver 214 is set to the maximum by the adjustment signal SG5. During this period, the emission level of the light-emitting diode 215 is maximum. However, the amplification factor is not limited to the maximum, and the amplification factor of the current driver 214 may be fixed to a predetermined value by the adjustment signal SG5. From the time t1 to the time t2 when the transmission signal TX falls, the amplification factor of the current driver 214 is inversely proportional to the holding voltage VM by the adjustment signal SG5. In this case, the emission level of the light-emitting diode 215 is inversely proportional to the holding voltage VM.

When the received light level is high (i.e., when the communication distance is short, or the communication state is good), the holding voltage VM increases. In this case, the transmission current control circuit 223 generates the adjustment signal SG5 in order to suppress the amplification factor of the current driver 214 in accordance with the communication distance or communication state (i.e., to reduce the emission level of the light-emitting diode 215 to a predetermined level). When the received light level is low (i.e., when the communication distance is far, or the communication state is not preferable), the holding voltage VM drops. In this case, the transmission current control circuit 223 generates the adjustment signal SG5 to increase the amplification factor of the current driver 214 (i.e., to increase the emission level of the light-emitting diode 215).

Next, the operation of the optical communication device 220 will be described.

Case 1. A local station has the optical communication device 220 and a remote station has an optical communication device that is not provided with the function for automatically adjusting the transmission output level.

As shown in FIG. 18(a), the light-emitting diode of the optical communication device of the remote station sends a burst signal that conforms to a transmission current Idrv. The photodiode 211 of the optical communication device 220 of the local station generates a receiving current IPD that corresponds to the burst signal and the amplifier 212 converts the receiving current IPD to the voltage signal VA. The comparator 213 converts the voltage signal VA to the reception signal RX. The voltage holding circuit 222 holds the peak voltage VM of the voltage signal VA.

Then, the timing control circuit 224 of the optical communication device 220 of the local station receives the transmission signal TX having the H level from the internal circuit and converts the transmission signal TX to the timing signal SG4. The transmission current control circuit 223 supplies the predetermined adjustment signal SG5 to the current driver 214 in accordance with the timing signal SG4 having the L level until the time t1 elapses from the rise time of the transmission signal TX. The current driver 214 receives the transmission signal having the H level and the predetermined adjustment signal SG5 and generates the transmission current Idrv at the maximum amplification factor. Accordingly, until the time t1 elapses, the light-emitting diode 215 emits light at the maximum level.

Next, the transmission current control circuit 223 supplies the predetermined adjustment signal SG5 to the current driver 214 in accordance with the timing signal SG4 having the H level from the time t1 to the time t2 when the transmission signal TX falls. The current driver 214 receives the transmission signal having the H level and the predetermined adjustment signal SG5 and generates the transmission current Idrv at an amplification factor that is inversely proportional to the holding voltage VM. Accordingly, when the holding voltage VM is high (i.e., when the communication distance is short, or communication state is good), the emission level of the light-emitting diode 215 is suppressed low until the time t2 elapses from the time t1. Conversely, when the holding time VM is low (i.e., when the communication distance is far, or communication state is not preferable), the emission level of the light-emitting diode is increased until the time t2 elapses from the time t1. The emission level of the light-emitting diode 215 is thus adjusted in accordance with the received light level (i.e., the communication distance or communication state). Accordingly, the power consumption of the optical communication device 220 is reduced without calculating the emission level.

Case 2. Both the local and remote stations have the optical communication device 220.

As shown in FIG. 18(b), the light-emitting diode 215 of the optical communication device 220 of the remote station sends a burst signal that conforms to the transmission current Idrv. The transmission current Idrv has the maximum level until the time t1 elapses. Accordingly, the voltage holding circuit 222 of the local station holds the maximum level of the voltage signal VA as the peak voltage (holding voltage VM).

At transmitting, the voltage holding circuit 222 adjusts the emission level of the light-emitting diode 215 based on the holding voltage VM. This decreases the power consumption of the optical communication device 220. When the local station and the remote station have the optical communication device 220, the received light level is easily detected by the receiving circuit 210a because the transmission current Idrv having the maximum level is generated until the time t1 elapses.

Twelfth Embodiment

Figure 19:
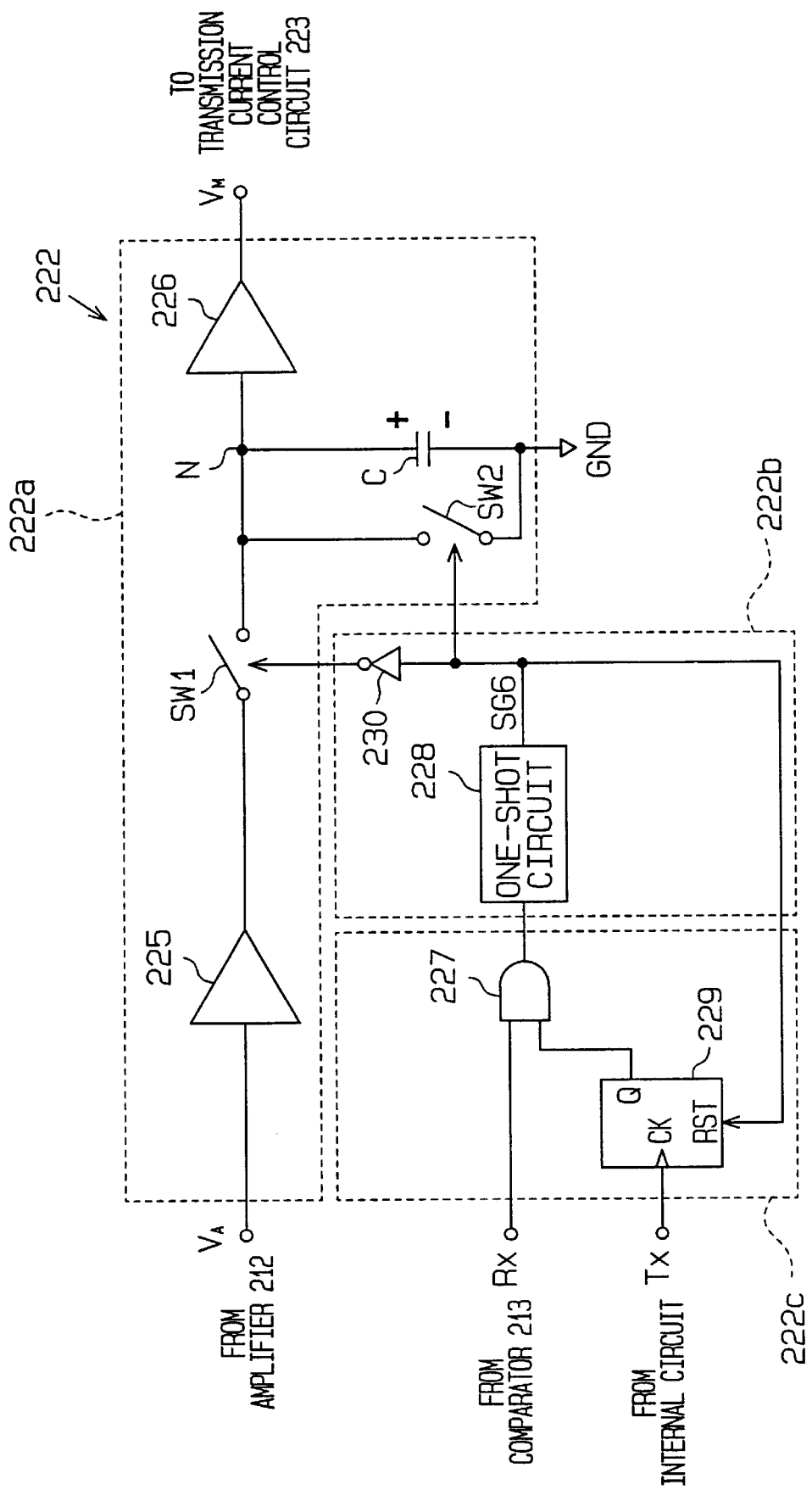
FIG. 19 is a circuit diagram of a voltage holding circuit of an optical communication device according to a twelfth embodiment of the present invention.

FIG. 19 is a schematic block diagram of the voltage holding circuit 222 of the optical communication device 220 of FIG. 17 according to a twelfth embodiment of the present invention. In FIG. 19, the circuits other than the voltage holding circuit 222 are the same as for FIG. 17. The voltage holding circuit 222 includes a hold circuit 222a, a switching control circuit 222b, and a reset circuit 222c. The hold circuit 222a includes first and second buffer circuits 225 and 226, first and second switches SW1 and SW2, and the capacitor C. The switching control circuit 222b includes an inverter circuit 230 and a one-shot circuit 228. The reset circuit 222c includes an AND circuit 227 and a flip-flop circuit 229.

The voltage signal VA supplied from the amplifier 212 to the voltage holding circuit 222 charges the capacitor C via the first buffer circuit 225, and a charging voltage is supplied to the transmission current control circuit 223 via the second buffer circuit 226 as the holding voltage VM. The configuration of the voltage holding circuit 222 is relatively simple. Further, the voltage holding circuit 222 starts charging the capacitor C with the voltage signal VA in accordance with the reception signal RX supplied from the comparator 213. Accordingly, a special signal for the charging control of the capacitor C is not required, and the circuit configuration is simplified. A latch circuit may be used instead of the capacitor C.

The input terminal of the first buffer circuit 225 is connected to the output terminal at the amplifier 212 which outputs the voltage signal VA, and the output terminal of the first buffer circuit 225 is connected to the input terminal of the second buffer circuit 226 via the first switch SW1. A node N between the switch SW1 and the input terminal of the second buffer circuit 226 is connected to ground GND via the capacitor C. The node N is further connected to ground GND via the second switch SW2. The first and second switches SW1 and SW2 turn on in response to the H level. The second buffer circuit 226 supplies the voltage at the node N from its output terminal to the transmission current control circuit 223 as the holding voltage VM.

The first input terminal of the AND circuit 227 is connected to the output terminal of the comparator 213 which outputs the reception signal RX, and the second input terminal of the AND circuit 227 is connected to an output terminal Q of the flip-flop circuit 229. The output terminal of the AND circuit 227 is connected to the one-shot circuit 228. The transmission signal TX from the internal circuit is supplied to the clock input terminal of the flip-flop circuit 229 as a clock signal.

The one-shot circuit 228 receives a pulse signal from the AND circuit 227 and generates the one-shot signal SG6 having a predetermined H level pulse width shorter than the H level pulse width of the pulse signal. The one-shot signal SG6 is supplied to the second switch SW2 (directly or via a buffer (not shown)) and is supplied to the first switch SW1 via the inverter circuit 230. Accordingly, the first and second switches SW1 and SW2 complementarily operate in response to the one-shot signal SG6. The one-shot signal SG6 is further supplied to the reset terminal of the flip-flop circuit 229. The flip-flop circuit 229 outputs an output signal Q High until a one-shot signal SG6 High is supplied to the reset terminal in response to the rise of the transmission signal TX. The flip-flop circuit 229 further outputs an output signal Q Low until the transmission signal TX rises in response to the one-shot signal SG6 High.

Figure 20:
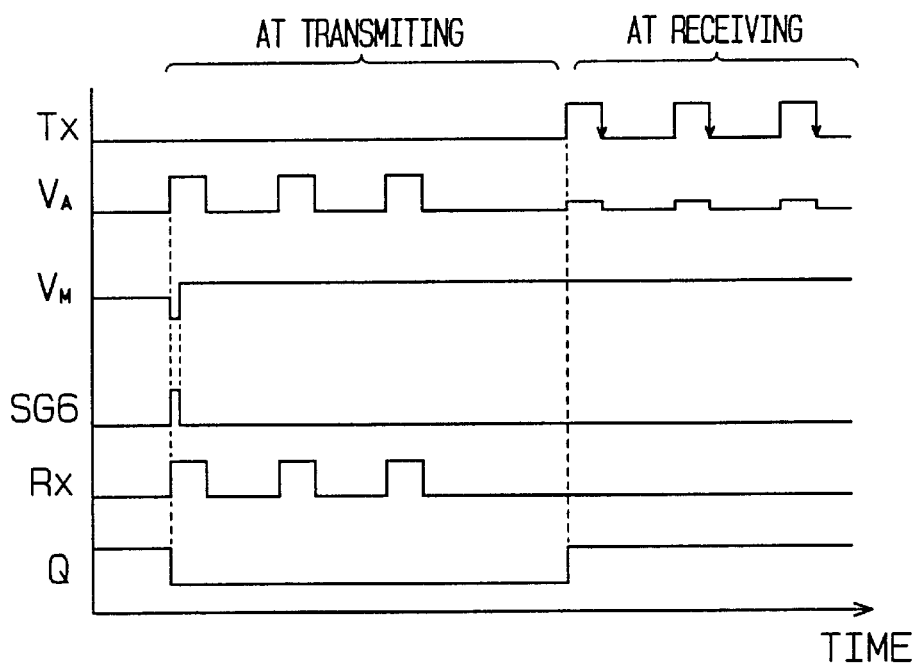
FIG. 20 is a waveform diagram showing the operation of the voltage holding circuit of FIG. 19.

The operation of the voltage holding circuit 222 will be described in accordance with FIG. 20. Here, assume the flip-flop circuit 229 outputs the output signal Q High in response to the rise of the transmission signal TX supplied from the internal circuit. The AND circuit 227 supplies an output signal High to the one-shot circuit 228 in response to the rise of the reception signal RX supplied from the comparator 213 as soon as receiving starts. The one-shot circuit 228 outputs the one-shot signal SG6 High in response to the output signal High. In response to the one-shot SG6 High, the second switch SW2 is turned on (closed) and the first switch SW2 is turned off (opened). Hereupon, the electric charge accumulated in the capacitor C is discharged to ground GND via the second switch SW2, and the node N is set to the ground GND level. Accordingly, the holding voltage VM having the ground GND level is output from the buffer circuit 226.

The flip-flop circuit 229 supplies the output signal Q Low to the AND circuit 227 in response to the one-shot signal SG6 High at its reset input. The AND circuit 227 supplies the output signal Low to the one-shot circuit 228 in response to the output signal Q Low. The one-shot circuit 228 outputs a one-shot signal SG6 Low in response to the output signal Low. In response to the one-shot signal SG6 Low, the first switch SW1 is turned on and the second switch SW2 is turned off. Hereupon, an electric charge is accumulated in the capacitor C by the voltage signal VA output from the first buffer circuit 226, and the voltage at the node N rises up to the level of the voltage signal VA. Thus, at the node N, the peak voltage of the voltage signal VA is held, and the holding voltage VM is supplied from the second buffer circuit 226 to the transmission current control circuit 223.

At transmitting, the flip-flop circuit 229 outputs the output signal Q High in response to the rise of the transmission signal TX supplied from the internal circuit. Then, the voltage holding circuit 222 receives the reception signal RX and performs the aforementioned operation.

Thirteenth Embodiment

The optical communication device according a thirteenth embodiment of the present invention is described using FIG. 17. In the thirteenth embodiment, the control of the amplification factor of the current driver 214 by the transmission current control circuit 223 differs from that of the eleventh embodiment.

Figure 21:
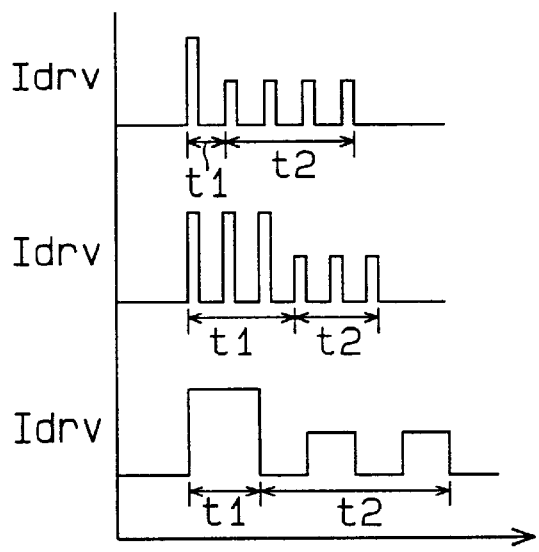
FIGS. 21(a) and 21(b) are a waveform diagrams of a transmission current generated by an optical communication device according to a thirteenth embodiment of the present invention.
Figure 21:
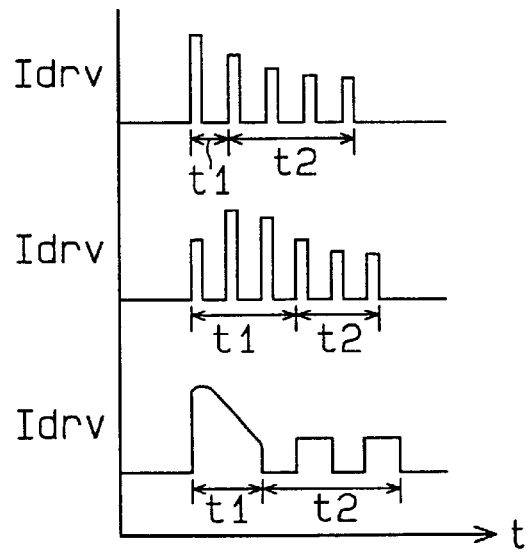

The transmission current control circuit 223 according to the thirteenth embodiment, as shown in shown in FIG. 21(b), controls the amplification factor of the current driver 214 in a step-like manner based on the holding voltage VM to prevent the difference between the amplitude of the transmission current Idrv in the time t1 and the amplitude of the transmission current Idrv in the time t2. FIG. 21(a) is a waveform diagram showing the three patterns of the transmission current Idrv in which the amplification factor of the current driver 214 is not controlled in a step-like manner. FIG. 21(b) is a waveform diagram showing the three patterns of the transmission current control Idrv in which the amplification factor is controlled in a step-like manner. This control allows the amplifier 212 of the receiving circuit 210a of the remote station to smoothly convert the receiving current generated by a photodiode to a voltage signal. Accordingly, the voltage signal is accurately converted to a digital signal by a comparator.

Fourteenth Embodiment

Figure 22:
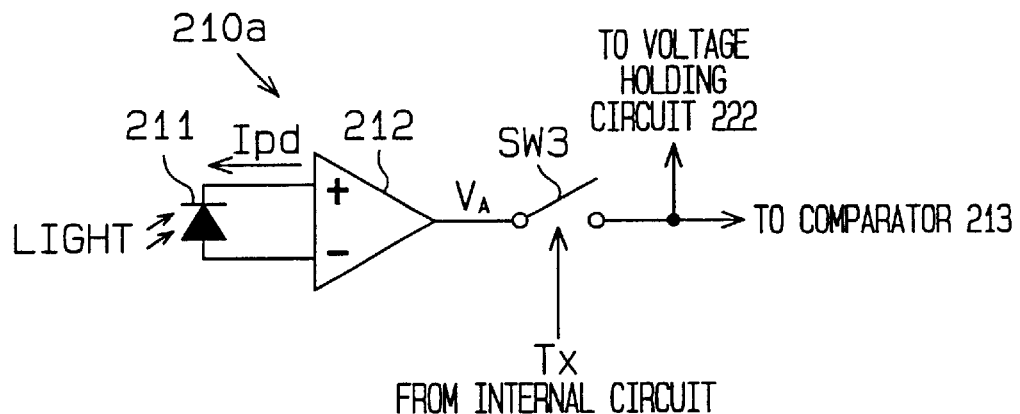
FIG. 22 is a circuit diagram of a receiving circuit of an optical communication device according to a fourteenth embodiment of the present invention.

FIG. 22 is a block diagram of the receiving circuit 210a in the optical communication device according to a fourteenth embodiment of the present invention. The receiving circuit 210a includes a switch SW3 connected between the amplifier 212 and a node between the comparator 213 and the voltage holding circuit 222. The switch SW3 turns off in response to a transmission signal TX High from the internal circuit. Accordingly, the voltage signal VA output from the amplifier 212 is not supplied to the comparator 213. As a result, the light-emitting diode 215 of the local station emits light and the malfunction of the receiving circuit 210a is prevented.

Fifteenth Embodiment

Figure 24A:
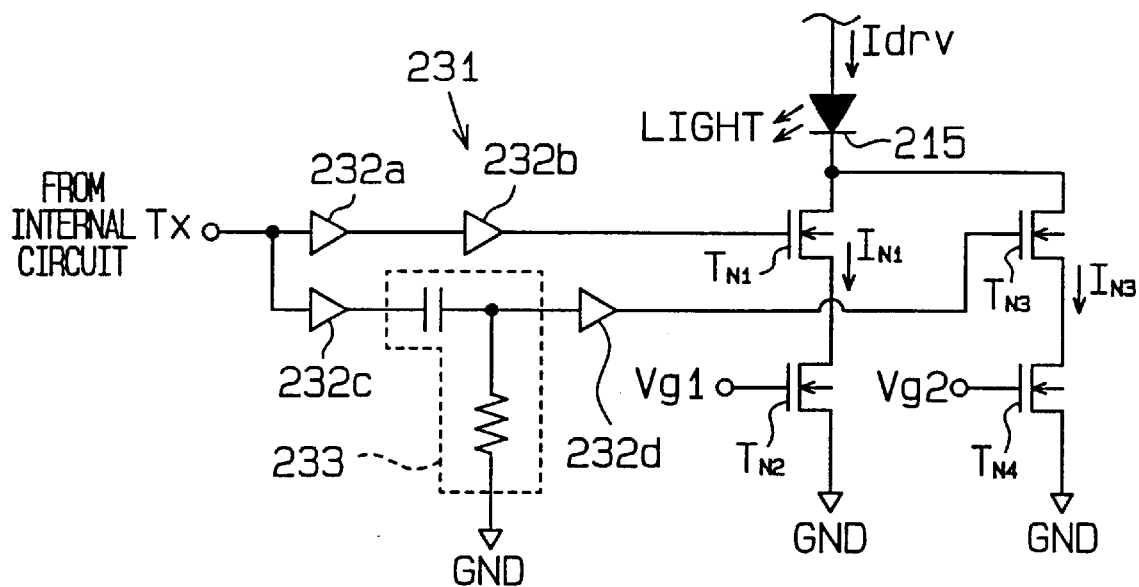
FIG. 24(a) is a circuit diagram of a waveform shaping circuit of an optical communication device according to a fifteenth embodiment of the present invention.

FIG. 24(a) is a circuit diagram of a waveform shaping circuit 231 included in the optical communication device according to a fifteenth embodiment of the present invention. In FIG. 24(a), the circuits other than the waveform shaping circuit 231 are the same as for FIG. 17.

Figure 23A:
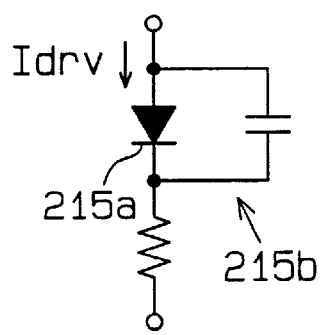
FIG. 23(a) is an equivalent circuit diagram of a light-emitting diode.
Figure 23B:
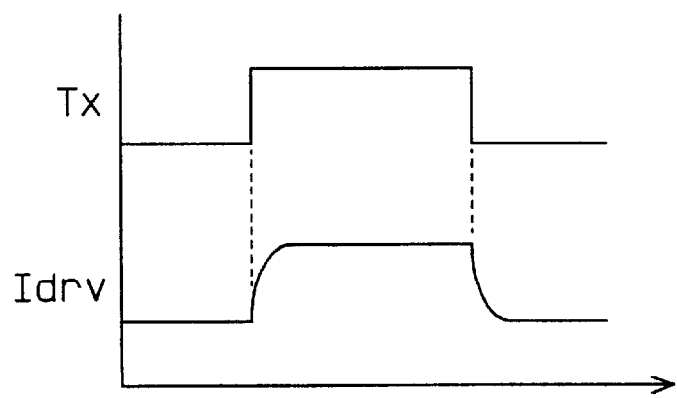
FIG. 23(b) is a waveform diagram of a transmission signal and the receiving current applied to a light-emitting diode.

The waveform shaping circuit 231 is connected to the cathode of the light-emitting diode 215 and shapes the waveform of the transmission current Idrv supplied to the light-emitting diode 215. As shown in the equivalent circuit of the light-emitting diode 215 of FIG. 23(a), a diode 215a has a parasitic element 215b including a resistor and a capacitor. The parasitic element 215b, as shown in FIG. 23(b), depresses the leading and trailing edges of the transmission current Idrv. The depression appears sharply when the level of the transmission current Idrv is low. The waveform shaping circuit 231 reduces the edge depression of the transmission current Idrv based on the level of the transmission current Idrv.

Specifically, the cathode of the light-emitting diode 215 is connected to ground GND via series connected NMOS transistors TN1 and TN2 and is connected to ground GND via series connected NMOS transistors TN3 and TN4. The gate of the NMOS transistor TN1 receives the transmission signal TX from the internal circuit via first and second buffer circuits 232a and 232b. The gate of the NMOS transistor TN3 receives the transmission signal TX from the internal circuit via a third buffer circuit 232c, a differential circuit 233 including a capacitor and a resistor, and a fourth buffer circuit 232d. The gates of the NMOS transistors TN2 and TN4 receive first and second reference voltages Vg1 and Vg2, respectively. The NMOS transistors TN2 and TN4 form a constant current source. The differential circuit 233 converts the transmission signal to a differential waveform signal.

Figure 24B:
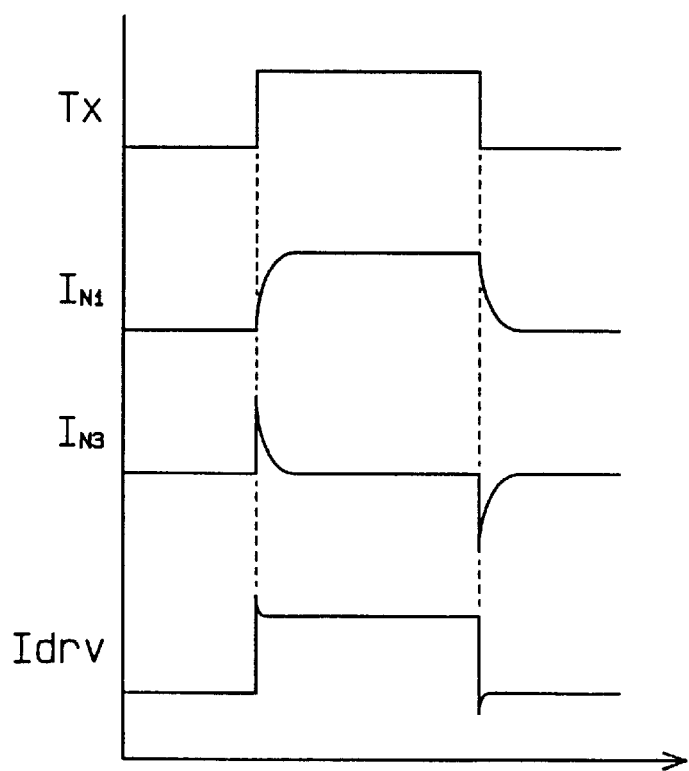
FIG. 24(b) is a waveform diagram showing the operation of the waveform shaping circuit of FIG. 24(a).

When the transmission signal TX having the H level is supplied to the waveform shaping circuit 231, as shown in FIG. 24(b), a drain current $I_{N1}$ in which the leading and trailing edges of the waveform are depressed flows in the NMOS transistor TN1. Further, a drain current $I_{N3}$ that is a complementary current for complementing the depression of the leading and trailing edges of the drain current $I_{N1}$ flows in the NMOS transistor TN3. The drain current $I_{N3}$ has a differential waveform. The transmission current Idrv is a composite current of the drain currents $I_{N1}$ and $I_{N3}$. Accordingly, the leading and trailing edges of the transmission current Idrv vary suddenly. As a result, the edge depression of the transmission current Idrv is prevented, the light-emitting diode 215 accurately emits light, and incorrect detection of the receiving circuit of the remote station is prevented.

Figure 25:
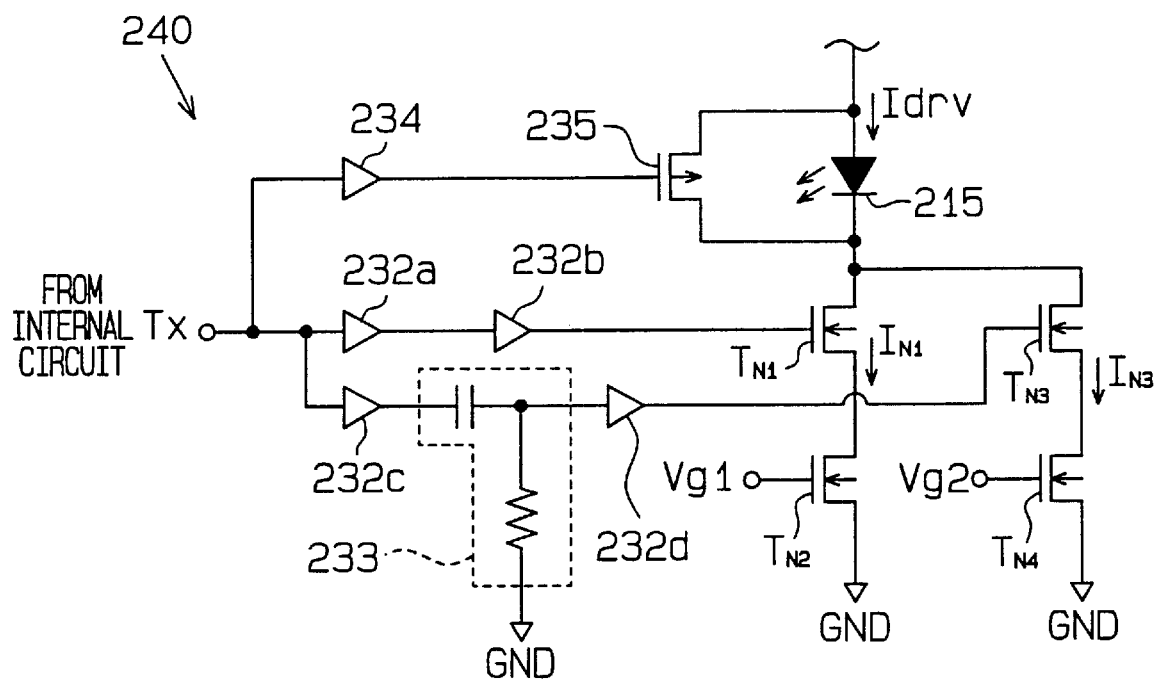
FIG. 25 is a circuit diagram of a modified example of the waveform shaping circuit of FIG. 24(a).

FIG. 25 is a circuit diagram of a modified example of the waveform shaping circuit of FIG. 24(a). The modified waveform shaping circuit 240 includes a PMOS transistor 235 connected in parallel with the light-emitting diode 215 and a buffer circuit 234 connected between the inputs of the first and second buffer circuits 232a and 232b and the gate of the PMOS transistor 235. The PMOS transistor 215 allows the transmission current Idrv to quickly fall when the transmission signal TX is deactivated.

It should be apparent to those skilled in the art that the present invention may be embodied in many other specific forms without departing from the spirit or scope of the invention. Particularly, it should be understood that the invention may be embodied in the following forms.

The transistors Tr2 to Tr5 and Tr7 to Tr10 may use the MOS transistors and the transistors Tr6 and Tr11 may use bipolar transistors. Further, the transistors Tr2 to Tr11 may be integrated into the bipolar transistors or the MOS transistors.

Therefore, the present examples and embodiments are to be considered as illustrative and not restrictive and the invention is not to be limited to the details given herein, but may be modified within the scope and equivalence of the appended claims.

What is claimed is:

1. A receiving circuit, comprising:
   a light receiving element for generating a current signal that corresponds to received light;
   a current distribution circuit, connected to the light receiving element, for distributing the current signal to first and second current signals in accordance with a predetermined distribution ratio;
   a first amplifier, connected to the current distribution circuit, for converting the first current signal to a first voltage signal;
   a second amplifier, connected to the current distribution circuit, for converting the second current signal to a second voltage signal; and a current control circuit, connected to the light receiving element and the second amplifier, for controlling the amount of current of the first current signal in accordance with the second voltage signal.

2. The circuit of claim 1, wherein the current distribution circuit includes a current mirror circuit having first and second transistors connected to the first and second amplifiers, respectively, and the first and second transistors have a size ratio that determines the predetermined distribution ratio of the first and second current signals.

3. The circuit of claim 2, wherein the current control circuit includes a clamping circuit for clamping the first current signal at a constant value when the voltage of the second voltage signal exceeds a predetermined value.

4. The circuit of claim 2, wherein the second amplifier includes:
   a resistor connected to the second transistor; and
   a plurality of diodes connected in parallel with the resistor.

5. The circuit of claim 4, wherein the current control circuit includes a clamping circuit, connected to a node between the resistor and the second transistor, for clamping the amount of current of the first current signal at a constant value when the second voltage signal at the node exceeds a predetermined value.

6. The receiving circuit of claim 1 further comprising a high pass filter connected between the second amplifier and the current control circuit.

7. The receiving circuit of claim 1 further comprising a high pass filter connected between the light receiving element and the current control circuit.

8. The receiving circuit of claim 1, further comprising:
   a detection circuit, connected to the first amplifier, for detecting a low frequency component included in the first voltage signal and generating a detection signal; and
   a circuit, connected to the light receiving element and the detection circuit, for eliminating the low frequency component from the current signal based on the detection signal.

* * * * *